US012728557B2

(12) United States Patent
Hummel

(10) Patent No.: US 12,728,557 B2
(45) Date of Patent: Sep. 8, 2026

(54) METHOD AND APPARATUS FOR SECURING A SAWBLADE

(71) Applicant: Woodpeckers, LLC, Strongsville, OH (US)

(72) Inventor: Richard Martin Hummel, Columbia Station, OH (US)

(73) Assignee: Woodpeckers, LLC, Strongsville, OH (US)

( * ) Notice: Subject to any disclaimer, the term of this patent is extended or adjusted under 35 U.S.C. 154(b) by 0 days.

(21) Appl. No.: 18/789,937

(22) Filed: Jul. 31, 2024

(65) Prior Publication Data

US 2026/0034701 A1 Feb. 5, 2026

(51) Int. Cl.

| | |
|---|---|
| ***F16B 43/00*** | (2006.01) |
| ***B27B 5/34*** | (2006.01) |
| ***F16B 41/00*** | (2006.01) |

(52) U.S. Cl.

CPC .............. *B27B 5/34* (2013.01); *F16B 41/002* (2013.01); *F16B 43/00* (2013.01)

(58) Field of Classification Search

CPC ........ F16B 43/00; F16B 41/002; F16B 21/18; F16B 21/19; F16B 2/065; F16B 21/186

USPC ................................. 411/531, 999, 517, 518

See application file for complete search history.

(56) References Cited

U.S. PATENT DOCUMENTS 15,262 A 7/1856 Ward
71,499 A 11/1867 Kibkman
139,150 A 5/1873 Henszey
142,131 A 8/1873 Spang
146,886 A 1/1874 Doane et al.
162,814 A 5/1875 Geaves et al.
261,090 A 7/1882 Grill
264,412 A 9/1882 Kuhlmann
278,130 A 5/1883 Geoff
299,480 A 5/1884 Kuhlmann
302,041 A 7/1884 Sill
307,112 A 10/1884 Geoff
315,513 A 4/1885 Kiddee
320,790 A 6/1885 Paekee
(Continued)

FOREIGN PATENT DOCUMENTS

CA 299480 A 4/1930
CA 997720 A1 9/1976
(Continued)

OTHER PUBLICATIONS https://www.sawstopstore.com/?post_type=product&s=arbor+nut, retrieved Aug. 19, 2024.
https://www.sawstopstore.com/?post_type=product&s=arbor+nut.

*Primary Examiner* — Flemming Saether

(74) *Attorney, Agent, or Firm* — Sand, Sebolt & Wernow Co., LPA

(57) ABSTRACT

Disclosed is an apparatus for retaining a saw blade set on an arbor. The apparatus may be an integrated dado nut assembly and may have a dado nut, a removable dado washer and a lockring. The dado nut is configured to be rotatably slidingly connected to the dado washer while providing for an axial force to be transmitted from the dado nut being rotated on the arbor through the dado washer to an outer blade of the saw blade set with a substantially full thread engagement. The integrated dado nut assembly is configured to be clampingly engaged by a lockring.

12 Claims, 15 Drawing Sheets

(56) References Cited

U.S. PATENT DOCUMENTS 366,633 A 7/1887 Mackintosh
386,806 A 7/1888 Faewell
486,874 A 11/1892 Huther
509,253 A 11/1893 Shields
521,997 A 6/1894 Whitus
545,504 A 9/1895 Hoover
614,399 A 11/1898 Lee
620,248 A 2/1899 Dayid
636,997 A 11/1899 Huson
648,000 A 4/1900 Thomas
665,737 A 1/1901 Haussmann
682,810 A 9/1901 Parks
713,196 A 11/1902 Bennett
716,094 A 12/1902 Peoples
737,194 A 8/1903 Armstrong
737,360 A 8/1903 Daly
741,034 A 10/1903 Hazelton
800,143 A 9/1905 Fox
869,513 A 10/1907 Pfeil
882,207 A 3/1908 Mccomb
901,799 A 10/1908 Fillet
910,562 A 1/1909 Meyers
941,726 A 11/1909 Pfalzgraf
982,312 A 1/1911 Swafford
997,720 A 7/1911 Troupenat
1,035,735 A 8/1912 Pogue
1,037,843 A 9/1912 Ackley
1,050,649 A 1/1913 Elmer et al.
1,054,558 A 2/1913 Jones
1,074,198 A 9/1913 Vosburgh
1,082,870 A 12/1913 Humason
1,089,901 A 3/1914 Emery
1,101,515 A 6/1914 Adam
1,125,364 A 1/1915 Martin
1,126,970 A 2/1915 Folmer
1,132,129 A 3/1915 Stevens
1,139,659 A 5/1915 Cleveland
1,148,169 A 7/1915 Howe
1,154,209 A 9/1915 Rushton
1,194,075 A 8/1916 Rorick
1,205,246 A 11/1916 Mowry
1,228,047 A 5/1917 Reinhold
1,240,430 A 9/1917 Erickson
1,244,187 A 10/1917 Frisbie
1,285,628 A 11/1918 Craley
1,455,426 A 5/1923 Charles
1,545,293 A 7/1925 Ware
1,551,900 A 9/1925 Morrow
1,568,199 A 1/1926 Watson
1,584,086 A 5/1926 Fonda
1,626,599 A 5/1927 Carthew
1,668,061 A 5/1928 Falkins
1,679,103 A 7/1928 Thomson
1,763,463 A 6/1930 Garthe
1,764,950 A 6/1930 Griner
1,816,069 A 7/1931 Bennett
1,920,319 A 8/1933 Regenhardt et al.
1,988,243 A 1/1935 Johnson
2,017,114 A * 10/1935 Winchester ............. F16B 39/26 411/533
2,038,810 A 4/1936 Tautz
2,075,282 A 3/1937 Hedgpeth
2,131,492 A 9/1938 Ocenasek
2,286,633 A 6/1942 Mccabe
2,393,585 A 1/1946 Boynton et al.
2,458,216 A 1/1949 Spindt
2,498,221 A * 2/1950 Poupitch ................. F16B 39/26 411/964
2,505,958 A 5/1950 Grierson
2,518,684 A 8/1950 Harris
2,544,814 A 3/1951 Warren
2,554,124 A 5/1951 Salmont
2,562,327 A * 7/1951 Moore .................... B24B 45/00 403/259
2,572,042 A * 10/1951 Martin .................... B24B 45/00 451/342
2,592,382 A 4/1952 Blais
2,593,596 A 4/1952 Olson
2,599,107 A 6/1952 Hebestreit
2,610,658 A 9/1952 Koeling
2,652,863 A 9/1953 Grabinski
2,665,722 A 1/1954 Edgemond, Jr.
2,695,667 A 11/1954 Carroll
2,704,560 A 3/1955 Woessner
2,719,547 A 10/1955 Gjerde
2,751,942 A * 6/1956 Emmons ................... B27B 5/34 144/237
2,777,485 A 1/1957 Farrow
2,787,301 A 4/1957 Anderson
2,788,812 A 4/1957 Jacobs
2,823,713 A 2/1958 Goldsmith
2,844,173 A 7/1958 Gaskell
2,850,054 A 9/1958 Eschenburg
2,852,047 A 9/1958 Odlum et al.
2,854,044 A 9/1958 Raguse
2,873,773 A 2/1959 Gaskell
2,898,893 A 8/1959 Rohrer et al.
2,903,848 A 9/1959 Mayhew et al.
2,922,449 A 1/1960 Sam
2,925,108 A 2/1960 Freeman
2,937,672 A 5/1960 Gjerde
2,945,516 A 7/1960 Edgemond, Jr. et al.
2,964,327 A 12/1960 Mohr
2,985,206 A 5/1961 Letts
3,005,477 A 10/1961 Sherwen
3,011,533 A 12/1961 Newman, Sr.
3,013,592 A 12/1961 Ambrosio et al.
3,146,010 A 8/1964 Dellith
3,172,437 A 3/1965 Hansen
3,178,197 A 4/1965 Boatner
3,179,438 A 4/1965 Field
3,280,861 A 10/1966 Gjerde
3,289,713 A 12/1966 Herzog
3,320,740 A 5/1967 Hamkins
3,368,596 A 2/1968 Comer
3,386,322 A 6/1968 Stone et al.
3,386,482 A 6/1968 Nadeau
3,411,392 A 11/1968 Spangler
3,547,232 A 12/1970 Fergle
3,670,788 A 6/1972 Pollak et al.
3,715,015 A 2/1973 Morris
3,780,780 A 12/1973 Pettigrew et al.
3,785,230 A 1/1974 Lokey
3,827,686 A 8/1974 Storkh
3,848,512 A 11/1974 Erhardt
3,946,631 A 3/1976 Malm
3,954,051 A 5/1976 Steiniger
3,994,484 A 11/1976 Schorr
4,018,256 A 4/1977 Niehaus et al.
4,055,204 A 10/1977 Gunzner et al.
4,068,550 A 1/1978 Gray et al.
4,134,438 A 1/1979 Frieberg et al.
4,159,821 A 7/1979 Hickman
4,161,272 A 7/1979 Brockl
4,161,974 A 7/1979 Patterson
4,173,849 A 11/1979 Mar
4,195,542 A 4/1980 Zimmer
4,205,572 A * 6/1980 Weiner .................. F16B 31/028 30/388
4,215,609 A 8/1980 Buinewicz et al.
4,256,000 A 3/1981 Seidel
4,279,280 A 7/1981 Pairis
4,305,441 A 12/1981 Ohmi
4,334,450 A 6/1982 Benuzzi
4,389,766 A 6/1983 Capuano
D273,561 S 4/1984 Ozaki et al.
4,453,112 A 6/1984 Sauer et al.
4,502,165 A 3/1985 Szemeredi et al.
4,503,739 A 3/1985 Konieczka
4,589,458 A 5/1986 Mccord, Jr.
4,617,544 A 10/1986 Mooz et al.
4,641,562 A 2/1987 Clarke
4,677,920 A 7/1987 Eccardt

(56) References Cited

U.S. PATENT DOCUMENTS 4,693,158 A 9/1987 Price
4,696,282 A 9/1987 Incitti
4,732,182 A 3/1988 Gorsha
4,817,693 A 4/1989 Schuler
4,887,653 A 12/1989 Thomas
4,899,795 A 2/1990 Hackett
4,915,149 A 4/1990 Herenyi et al.
5,018,562 A 5/1991 Adams
5,020,578 A 6/1991 Jennings
5,038,486 A 8/1991 Ducate, Sr.
5,063,983 A 11/1991 Barry
5,065,802 A 11/1991 Peterson
5,159,864 A 11/1992 Wedemeyer et al.
5,174,349 A 12/1992 Svetlik et al.
5,197,841 A 3/1993 Tanaka
5,224,531 A 7/1993 Blohm
5,230,269 A 7/1993 Shiotani et al.
5,238,037 A 8/1993 Gunzner et al.
5,309,962 A 5/1994 Mccord, Jr. et al.
5,316,061 A 5/1994 Lee
5,337,641 A 8/1994 Duginske
5,368,079 A 11/1994 Benway
5,398,740 A 3/1995 Miller
5,422,551 A 6/1995 Takeda et al.
5,510,884 A 4/1996 Bov, Jr. et al.
5,579,584 A 12/1996 Hoffman
5,596,253 A 1/1997 Mizuta et al.
5,618,145 A * 4/1997 Kuo ...................... F16B 21/186 411/533
5,636,428 A 6/1997 Van Mourik
5,655,583 A 8/1997 Heintzeman
5,666,586 A 9/1997 Nishimura et al.
5,722,308 A 3/1998 Ceroll et al.
5,815,932 A 10/1998 Presher et al.
5,902,084 A * 5/1999 Garcia .................... F16D 1/076 411/917
5,974,674 A 11/1999 Kelly
5,975,821 A * 11/1999 Kue ........................ F16B 43/00 411/533
6,042,461 A * 3/2000 Pearson ............... B23D 45/042 451/353
6,076,445 A 6/2000 Kenyon et al.
6,133,818 A 10/2000 Hsieh et al.
D453,000 S 1/2002 Shinjo et al.
D459,207 S 6/2002 Miyata
6,418,829 B1 7/2002 Pilchowski
6,430,007 B1 8/2002 Jabbari
6,463,970 B1 10/2002 Bradshaw
6,554,552 B2 * 4/2003 McKinlay ............... F16B 39/26 411/533
6,574,867 B1 6/2003 Bradshaw
D484,037 S 12/2003 Fleetwood
6,713,980 B2 3/2004 Mukai et al.
6,840,144 B2 1/2005 Huang
6,942,229 B2 9/2005 Brazell et al.
D512,886 S 12/2005 Christensen
7,093,668 B2 8/2006 Gass et al.
7,134,373 B1 11/2006 Vice
D543,259 S 5/2007 Chueh et al.
7,210,386 B1 5/2007 Chang
D551,972 S 10/2007 Jacobs et al.
7,308,843 B2 12/2007 Gass et al.
7,350,445 B2 4/2008 Gass et al.
7,421,932 B1 9/2008 Heinzmann et al.
7,472,634 B2 1/2009 Gass et al.
7,481,140 B2 1/2009 Gass et al.
7,509,899 B2 3/2009 Gass et al.
7,525,055 B2 4/2009 Gass et al.
7,536,238 B2 5/2009 Gass
7,600,455 B2 10/2009 Gass et al.
7,621,205 B2 11/2009 Gass
7,628,101 B1 12/2009 Knapp et al.
7,644,645 B2 1/2010 Gass et al.
D609,999 S 2/2010 Andersson
7,681,479 B2 3/2010 Gass et al.
D614,247 S 4/2010 Clausen
7,707,918 B2 5/2010 Gass et al.
7,707,920 B2 5/2010 Gass et al.
7,712,403 B2 5/2010 Gass et al.
7,739,934 B2 6/2010 Tetelbaum et al.
7,784,507 B2 8/2010 Gass et al.
7,788,999 B2 9/2010 Gass et al.
7,827,893 B2 11/2010 Gass et al.
7,836,804 B2 11/2010 Gass
7,971,613 B2 7/2011 Gass et al.
7,997,176 B2 8/2011 Gass et al.
D646,154 S 10/2011 Andersson
8,122,807 B2 2/2012 Gass et al.
8,266,997 B2 9/2012 Gass et al.
D679,988 S 4/2013 Yamazaki
8,489,223 B2 7/2013 Gass
8,490,527 B2 7/2013 Gass et al.
8,498,732 B2 7/2013 Gass
8,505,424 B2 8/2013 Gass et al.
8,690,507 B1 * 4/2014 Jesel ....................... F16B 43/00 411/533
D704,314 S 5/2014 van de Klippe et al.
D713,705 S 9/2014 Mina et al.
D717,207 S 11/2014 Fondas et al.
D735,076 S 7/2015 Fondas et al.
9,079,258 B2 7/2015 Chung
9,724,840 B2 8/2017 Gass
D798,701 S 10/2017 Hill
9,981,326 B2 5/2018 Gass et al.
D823,101 S 7/2018 Wassdahl
10,052,786 B2 8/2018 Gass et al.
10,071,499 B2 9/2018 Gass
10,076,796 B2 9/2018 Chung
10,092,968 B2 10/2018 Fulmer et al.
10,562,114 B2 2/2020 Gass et al.
10,688,572 B2 6/2020 Fulmer et al.
D897,830 S 10/2020 Roberto et al.
D898,559 S 10/2020 Hill
10,882,207 B2 1/2021 Gass et al.
11,098,849 B2 8/2021 Gass et al.
D934,667 S 11/2021 Oggier, III et al.
D945,875 S 3/2022 Sailer et al.
D965,411 S 10/2022 Koblich et al.
D973,831 S 12/2022 Wu
11,731,783 B2 8/2023 Monaghan
D1,007,292 S 12/2023 Wu
D1,055,683 S 12/2024 Jin
D1,086,004 S 7/2025 Brunka
2002/0136617 A1 9/2002 Imahigashi
2002/0170399 A1 11/2002 Gass et al.
2004/0060404 A1 4/2004 Metzger, Jr.
2005/0039586 A1 2/2005 Gass et al.
2005/0039822 A1 2/2005 Gass et al.
2005/0139057 A1 6/2005 Gass et al.
2005/0139058 A1 6/2005 Gass et al.
2005/0166736 A1 8/2005 Gass et al.
2006/0060030 A1 3/2006 Lowder
2006/0101969 A1 5/2006 Garcia et al.
2006/0201300 A1 9/2006 Schwaiger et al.
2006/0201301 A1 9/2006 Schwaiger et al.
2006/0201302 A1 9/2006 Schwaiger et al.
2006/0219076 A1 10/2006 Gass et al.
2006/0247795 A1 11/2006 Gass et al.
2007/0101842 A1 5/2007 Gass
2007/0151433 A1 7/2007 Gass et al.
2007/0157784 A1 7/2007 Gass et al.
2007/0175306 A1 8/2007 Gass et al.
2008/0000673 A1 1/2008 Ishii et al.
2008/0092702 A1 4/2008 Gass et al.
2008/0178722 A1 7/2008 Gass et al.
2008/0184857 A1 8/2008 Gass et al.
2009/0178524 A1 7/2009 Gass et al.
2009/0210072 A1 8/2009 Gass et al.
2009/0236012 A1 9/2009 Gass et al.
2009/0293692 A1 12/2009 Gass et al.
2010/0050843 A1 3/2010 Gass et al.
2010/0288095 A1 11/2010 Gass et al.
2010/0307307 A1 12/2010 Butler

(56) References Cited

U.S. PATENT DOCUMENTS

| | | | |
|---|---|---|---|
| 2011/0048190 | A1 | 3/2011 | Chung |
| 2011/0048205 | A1 | 3/2011 | Chung |
| 2011/0061769 | A1 | 3/2011 | Gass |
| 2011/0126682 | A1 | 6/2011 | Gass et al. |
| 2012/0024427 | A1 | 2/2012 | Gass et al. |
| 2012/0042763 | A1 | 2/2012 | Gass et al. |
| 2012/0067181 | A1 | 3/2012 | Gass et al. |
| 2012/0090439 | A1 | 4/2012 | Butler |
| 2012/0168032 | A1 | 7/2012 | Gass |
| 2012/0186699 | A1 | 7/2012 | Gass |
| 2014/0360819 | A1 | 12/2014 | Gass et al. |
| 2015/0040737 | A1 | 2/2015 | Gass et al. |
| 2015/0151371 | A1 | 6/2015 | Gass et al. |
| 2015/0283630 | A1 | 10/2015 | Gass et al. |
| 2016/0121412 | A1 | 5/2016 | Fulmer et al. |
| 2016/0158959 | A9 | 6/2016 | Gass et al. |
| 2016/0243632 | A9 | 8/2016 | Fulmer et al. |
| 2017/0072481 | A1 | 3/2017 | Gass et al. |
| 2017/0334087 | A1 | 11/2017 | Gass |
| 2018/0333792 | A1 | 11/2018 | Gass et al. |
| 2018/0345527 | A1 | 12/2018 | Gass et al. |
| 2019/0016006 | A1 | 1/2019 | Gass |
| 2019/0091780 | A1 | 3/2019 | Fulmer et al. |
| 2019/0293235 | A1 | 9/2019 | Gass et al. |
| 2020/0376574 | A1 | 12/2020 | Fulmer et al. |
| 2022/0042648 | A1 | 2/2022 | Gass et al. |

FOREIGN PATENT DOCUMENTS

| | | | | |
|---|---|---|---|---|
| CA | 2140997 | A1 | | 7/1995 |
| CA | 2140991 | A1 | | 9/1995 |
| CH | 144238 | A | | 12/1930 |
| CH | 297525 | A | | 3/1954 |
| DE | 76186 | C | | 10/1893 |
| DE | 297525 | C | | 9/1913 |
| DE | 917746 | C | | 9/1954 |
| DE | 19609771 | A1 | | 6/1998 |
| DE | 20007037 | U1 | | 8/2000 |
| DE | 202004012468 | U1 | | 12/2004 |
| FR | 581645 | A | * | 12/1924 |
| GB | 144238 | A | | 6/1920 |
| WO | 0126064 | A2 | | 4/2001 |
| WO | 0126064 | A9 | | 11/2001 |
| WO | 03006213 | A2 | | 1/2003 |
| WO | 0126064 | A3 | | 9/2003 |
| WO | 03006213 | A3 | | 1/2004 |
| WO | 03006213 | A8 | | 4/2004 |
| WO | 03006213 | A9 | | 5/2004 |

* cited by examiner

L214F
L214H
L214D
214",214E
214B
214
210

C214E
214F
214G
C214G
214',214C
212,212A
214H
212A"
212',212A'
214J
216,216D
216B
216C
212E
212D
212F
214D
216A
212"
212C
212B
D214F
D214H
D214D
CL

L212
L212D
L212A
L212E
L4
210
214,214E
214'',214C
212,212A
212A''
212',212A'
214''
216
212E
212D
212F
214D
212''
212C
212B
D212F
D212E
CL

400

402 Threadably engaging an inner diameter thread of a passageway of an apparatus to an arbor 404 Rotating the apparatus distally on the arbor using a tool 406 Securing the set of saw blades to the arbor with the apparatus

METHOD AND APPARATUS FOR SECURING A SAWBLADE

TECHNICAL FIELD

This disclosure is directed to a woodworking attachment apparatus. Particularly, this disclosure is directed to a method and apparatus for securing a sawblade. More particularly, this disclosure is directed to a method and apparatus for securing a sawblade in conditions of which an arbor may have limited threading available for a washer and a securing nut.

BACKGROUND ART

Woodworking often requires various tools for cutting workpieces to particular dimensions or configurations. In some operations, tools may be used that are standard for one operation, and it may be desired to flexibly use those tools for other operations. Table saws have many known uses in woodworking. Familiar table saws include those manufactured by SawStop™, among many other manufacturers. A particular configuration that a table saw may be adapted to would be to provide dado cuts in workpieces for joining one or more workpieces together. Table saws may have arbors of a fixed length, configured for most all standard uses. With dado cuts, a table saw may be loaded with a dado cut blade stack, which typically stacks an outer blade, an inner blade, and a plurality of chipper blades between the outer blade and inner blade. As can be appreciated, the stacking of blades on a standard table saw arbor reduces available threading for a retaining nut (or arbor nut). In addition, to control the blade stack for the higher quality dado cut, it is often desired to provide a washer (or arbor washer) between the outer blade and the retaining nut, thereby further reducing available arbor threads.

It is also to be appreciated that table saws require removal of blades used for other purposes to switch tasks within a project (for example, changing blade sets from cuts with single saw blades to dado cuts, which require installation of a dado cut blade stack). Installing the dado cut blade stack, the separate washer, and then the retaining nut may lead to frustration due to the diminished arbor thread availability. Options of not using a washer are unsatisfying due to tendencies to degrade cut quality or to induce damage to equipment, such as warping cutting blades. Alternatively with a washer, a standard nut may fail its retaining purpose during use due to an insufficient thread holding. It is further to be appreciated that in the installation and handling of these multiple pieces with a reduced arbor thread area, it is easier to drop one or more of the retaining nut or washer, and this may be frustrating to then hunt and dig for the small piece(s) in the waste catch area of the table saw.

SUMMARY OF THE INVENTION

In one aspect, an exemplary embodiment of the present disclosure may provide an apparatus that retains a saw blade set on an arbor. The apparatus may be an integrated dado nut assembly and may have a dado washer that has a surface at an inner diameter, a dado nut that has a head portion that may be adapted to engage with a tool and a shank portion that may extend longitudinally from the head portion. A portion of the shank portion of the dado nut rotatably engages with the surface at the inner diameter of the dado washer. Further, the dado nut is threadably engageable with the arbor. It is to be appreciated that the dado nut is substantially coaxial with the dado washer. A lockring operably engages with the shank portion of the dado nut and with the dado washer, and the dado nut and dado washer are removably engageable with one another via the lockring. The lockring engages the dado nut in a dado nut groove defined in the shank portion of the dado nut at a groove distance distal from the head portion. The dado washer may have a proximal annular surface and at least two distal annular surfaces. The proximal annular surface may rotably engage with a distal portion of the dado nut head portion and a first of the at least two distal annular surfaces may rotably engage with the lockring. By "the dado nut threadably engageable" it is meant that a passageway that extends longitudinally from a proximal portion of the dado nut head to a distal end of the dado shank portion has an internal threading defined along the passageway. This internal threading is adapted to threadably engage with the arbor. The dado washer has one proximal annular surface and at least two distal annular surfaces, wherein the proximal annular surface rotably engages with a distal portion of the dado nut head portion and a first of the at least two distal annular surfaces rotably engages with a lockring and a second of the least two distal annular surfaces is adapted to engage with the saw blade. It is to be appreciated that the first of the at least two distal annular surfaces is interior to the second of the least two distal annular surfaces. The rotatable engagement of the portion of the shank portion of the dado nut and the surface at the inner diameter of the dado washer may be is provided by one or both of the dado washer surface at the inner diameter or the portion of the shank portion of the dado nut having a slip surface, or may be provided by the dado washer inner diameter sized to be greater than an outer diameter of the shank portion of the dado nut.

In another aspect, an exemplary embodiment of the present disclosure may provide a method of securing a set of sawblades on an arbor of a table saw with limited thread length remaining on the arbor. The method may threadably engage an inner thread of a passageway of an apparatus to the arbor, followed by rotating the apparatus distally on the arbor using a tool to a head portion of a dado nut portion of the apparatus, wherein the dado nut freely rotates inside of a dado washer portion of the apparatus. It is to be appreciated that the dado nut portion and the dado washer portion are substantially coaxial. This secures the set of sawblades to the arbor of the table saw with the arbor apparatus. An embodiment may include prior to threadably engaging an inner thread, the dado nut portion may be clampingly engaged or secured to the dado washer by a lockring, wherein the dado nut portion and dado washer portion are removably engageable with one another via the lockring. The lockring may be clamping engaged with a shank portion of the dado nut portion inside of a groove defined in the shank portion; and may be clamping engaged with a first of at least two distal annular surfaces of the dado washer portion. It is to be appreciated that the limited thread length remaining on the arbor precludes securing the set of sawblades on the arbor with a standard washer and standard nut.

In yet another aspect, an embodiment of an apparatus for retaining a saw blade set on an arbor with a limited open thread dimension may include a removable dado washer, that has a proximal annular surface, a surface at an inner diameter, and at least two distal annular surfaces; a dado nut, that has a head portion and a shank portion, and is threadably engageable with the arbor. It is to be appreciated that the dado nut is substantially coaxial with the removable dado washer and the removable dado washer is freely rotating about the dado nut. A lockring may operably engage with the shank portion of the dado nut and with a first of the at least two distal annular surfaces of the removable dado washer, engaging the dado nut in a dado nut groove defined in the shank portion of the dado nut at a groove distance distal from the head portion. The proximal annular surface may rotably engage a distal portion of the dado nut head portion, and a first of the at least two distal annular surfaces may rotably engage the lockring, while a second of the least two distal annular surfaces may be adapted to engage with the saw blade. It is contemplated that the dado nut being threadably engageable entails having a passageway defined to extend longitudinally from a proximal portion of the dado nut head to a distal end of the dado shank portion and an internal threading defined along the passageway; wherein the internal threading is adapted to threadably engage with the arbor. The ability of the dado washer freely rotating may be provided by the surface at the inner diameter of the removable dado washer engaging with a portion of the shank portion of the dado nut and one or both of the surface at the inner diameter or the portion of the shank portion of the dado nut having a slip surface or may be provided by the surface at the inner diameter of the removable dado washer engaging with a portion of the shank portion of the dado nut and the dado washer inner diameter sized to be greater than an outer diameter of the shank portion of the dado nut.

In one aspect, an exemplary embodiment of the present disclosure may provide an apparatus that retains a saw blade set on an arbor thread dimension. The apparatus may be an integrated dado nut assembly and may have a dado nut, a removable dado washer, and a lockring. The dado nut may be internally threaded to a specified inner diameter, and have a head, a shank and a centerline throughwith. The shank of the dado nut has an axial length and an outer diameter, and distal from the head of the dado nut, would have a groove defined on the surface of the outer diameter of the shank. The head of the dado nut has a proximal and a distal portion, orthogonal to the centerline, wherein the distal portion provides a mating annulus. The removable dado washer has a matching centerline to the dado nut, and has a surface on a first inner diameter, and a proximal annulus substantially orthogonal to the centerline. The proximal annulus mates in a rotably free manner with the dado nut distal portion of the dado nut head, providing a transfer of force from the dado nut being threaded on the arbor to provide a squeeze force through the removable dado washer to a saw blade set. The removable dado washer further has an outer surface of a frustum of a cone section, a surface at an outer diameter, and a furthest distal annulus substantially orthogonal to the centerline. The furthest distal annulus is in contact with an outer saw of the saw blade set. The furthest distal annulus transitions to a surface at a mid-inner diameter with a mid-axial length. This surface terminates in a mid-distal annulus that itself terminates in a third inner diameter—a surface that provides for a lockring clearance, The surface at the lockring clearance diameter terminates in a mid-proximal annulus that extends radially to the first inner diameter, wherein the mid- and third inner diameters are successively smaller than the dado washer outer diameter and each larger than the first inner diameter. The axial length between the mid-distal annulus and the proximal annulus substantially matches the axial length of the distal dado nut head to the proximal start of the dado nut groove. The lockring is sized to fit into the dado nut groove and protrude sufficiently orthogonally to capture the dado washer along the axial length between the mid-distal annulus and the proximal annulus thereby clampingly engaging or securing the dado washer and the dado nut.

In another aspect, an exemplary embodiment of the present disclosure may provide an apparatus that retains a saw blade set on an arbor. The apparatus may be an integrated dado nut assembly and may have a dado nut, a removable dado washer, and a lockring. The dado nut may be internally threaded to a specified inner diameter, and have a head, a shank and a centerline throughwith. The shank of the dado nut has an axial length and a surface at an outer diameter, and distal from the head of the dado nut, would have a groove defined on the surface of the outer diameter of the shank. The head of the dado nut has a proximal and a distal portion, orthogonal to the centerline, wherein the distal portion provides a mating annulus. The removable dado washer has a matching centerline to the dado nut, a surface at a first inner diameter, and a proximal annulus substantially orthogonal to the centerline. The proximal annulus mates in a rotably free manner with the nut distal portion of the dado nut head, providing a transfer of force from the dado nut being threaded on the arbor to provide a squeeze force through the removable dado washer to a saw blade set. The removable dado washer further has an outer surface of a frustum of a cone section, a surface at an outer diameter, and a furthest distal annulus substantially orthogonal to the centerline. The furthest distal annulus is in contact with an outer saw of the saw blade set. The furthest distal annulus transitions to a surface at a mid-inner diameter with a mid-axial length. This surface terminates in a mid-distal annulus that itself terminates in a third inner diameter—a surface that provides for a lockring clearance, The surface at the lockring clearance diameter terminates in a mid-proximal annulus that extends radially to the first inner diameter, wherein the mid- and third inner diameters are successively smaller than the dado washer outer diameter and each larger than the first inner diameter. The axial length between the mid-distal annulus and the proximal annulus substantially matches the axial length of the distal dado nut head to the proximal start of the dado nut groove. The rotably sliding or freely rotating connection is provided by having one or both dado washer first inner diameter or dado nut shank outer diameter to be a slip surface. The lockring is sized to fit into the dado nut groove and protrude sufficiently orthogonally to capture the dado washer along the axial length between the inner distal annulus and the proximal annulus thereby clampingly engaging or securing the dado washer and the dado nut.

In another aspect, an exemplary embodiment of the present disclosure may provide an apparatus for retaining a saw blade set on an arbor. The apparatus may be an integrated dado nut assembly and may have a dado nut, a removable dado washer and a lockring. The dado nut may be internally threaded to a specified inner diameter, having a groove defined on a surface of an outer diameter of a shank portion and have a mating annulus, orthogonal to a centerline, defined on a distal portion of a head of the dado nut. The removable dado washer may have a matching centerline, a surface at a first inner diameter, and a proximal annulus, a first distal annulus, a mid-distal annulus, and a mid-proximal annulus, with each annulus substantially orthogonal to the centerline. An axial length between the mid-proximal annulus and the proximal annulus may substantially match an axial length from the mating annulus to a proximal start of the dado nut groove. The proximal annulus rotably slidingly mates with the mating annulus. The lockring may be sized to fit into the dado nut groove and protrude sufficiently orthogonally to clampingly capture the dado washer along the axial length between the mid-distal annulus and the proximal annulus.

BRIEF DESCRIPTION OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

It is to be appreciated that in order to make a dado cut in a workpiece, sets of stacked blades-usually with an outer blade, an inner blade, and a number of chipper blades in the middle—may be placed as a set onto an arbor of a cutting device (without limitation, and as an illustrative example, a table saw arbor). After the set, herein called a dado cut blade stack, is placed on the arbor, assembly typically continues with placement of an arbor washer positioned next to the outer blade. An arbor washer is typically a large washer that extends against the dado cut blade stack in order to provide a higher quality cut. Assembly is completed with an addition of a retaining arbor nut that threads onto the arbor and pushes against the arbor washer. The large arbor washer allows for the force of the retaining nut to be spread evenly around the blade, so the blade is less likely to warp or bend and it also holds the blade more tightly to prevent the blade from slipping on the arbor as the arbors spins and the blade engages the workpiece. On some existing table saws, notably, SawStop™, a typical arbor is sized for typical table saw usage, but often may be too short for a desired usage of creating dado cuts in workpieces. A full stack of dado blades may take up approximately ¾ inch of available arbor threading, and this may not allow for the arbor washer and the arbor nut to engage with full threads on the arbor. A worker may consider this to be dangerous as the arbor nut could fall off and cause the blades to move during operation, ruining the work piece and potentially causing a safety hazard. Optionally, a lesser quality cut may be chosen by omitting the arbor washer, but this is not optimal, and may impact cut quality and harm equipment (for example, cutting blades may become distorted). As is known in the art, to obtain a best cutting performance, as washer is practically a necessity. Furthermore, during installation, since the arbor nut may not fully engage the arbor threads, the spinning of the arbor nut on the arbor may capture the arbor washer and blade set axially, but either without importing sufficient rotational force to the arbor washer that would transfer to the saw blades, thereby providing a poor quality cut to the workpiece, or importing too much rotational force to the arbor washer that would transfer to the saw blades, thereby marring or otherwise damaging the outer blade. In contrast, an option such as fully integrating a washer into a nut (a unibody washer/nut design—not shown), has been determined to be detrimental, as tightening the nut sufficiently would engage the unibody washer against the blade in a manner that would mar and damage the outer blade.

Figure 1A:
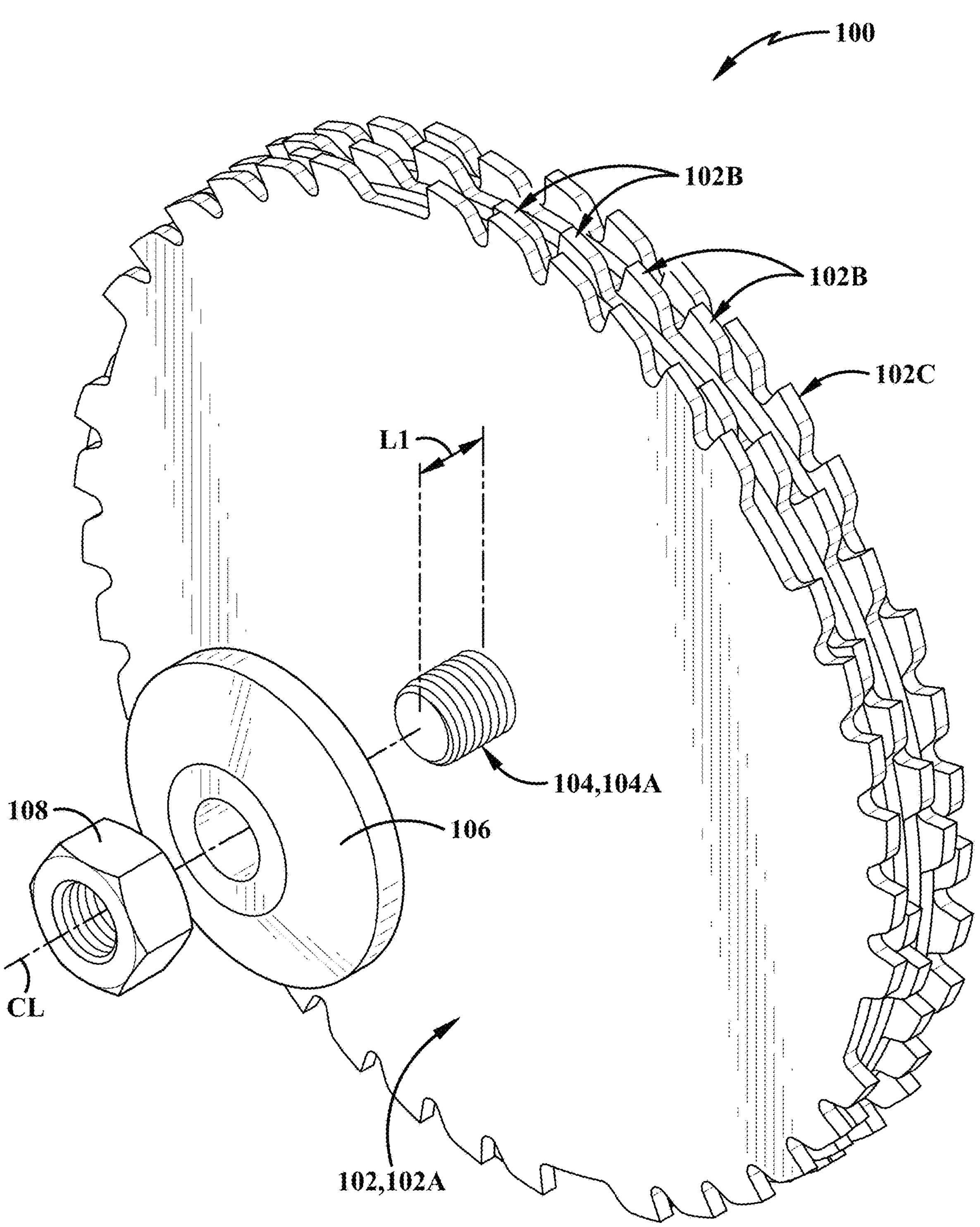
FIG. 1A is a semi-exploded isometric view of an exemplary prior art configuration of a dado cut blade stack on an arbor, a washer and a retaining nut.

A standard condition (or use case) may be explained in reference to PRIOR ART FIG. 1A through FIG. 1D. Turning to FIG. 1A, a semi-exploded isometric view of an exemplary prior art configuration 100 of dado cut blade stack 102 on arbor 104, arbor washer 106 and retaining arbor nut 108 is provided. It is to be appreciated that most all items will share a centerline CL. Arbor 104 will have a standard arbor thread 104A, upon which retaining arbor nut 108 threadingly engages. In this view, dado cut blade stack 102 has already been placed on arbor 104 of a saw or table saw (not shown), for example, a SawStop™ table saw. In this example, dado cut blade stack 102 provides outer blade 102A, a number of middle blades 102B (for example, chipper blades, and in this example, the number of chipper blades is four), and inner blade 102C. As is known in the art, such configurations provide a dado cut blade stack that may provide a dado cut on a work piece while flexibly using a table saw that may be used for a number of other operations on a project, by simply changing out the blade stack for other saw blades as may be desired. As shown, the placement of dado cut blade stack 102 leaves thread length L1 on arbor 104. There are standard washers and standard nuts for general use with a table saw and dado cuts. A standard washer, for example arbor washer

106 may provide better control of outer blade 102A of dado cut blade stack 102. Standard arbor nut 108 would be typically used to secure the tool.

Figure 1B:
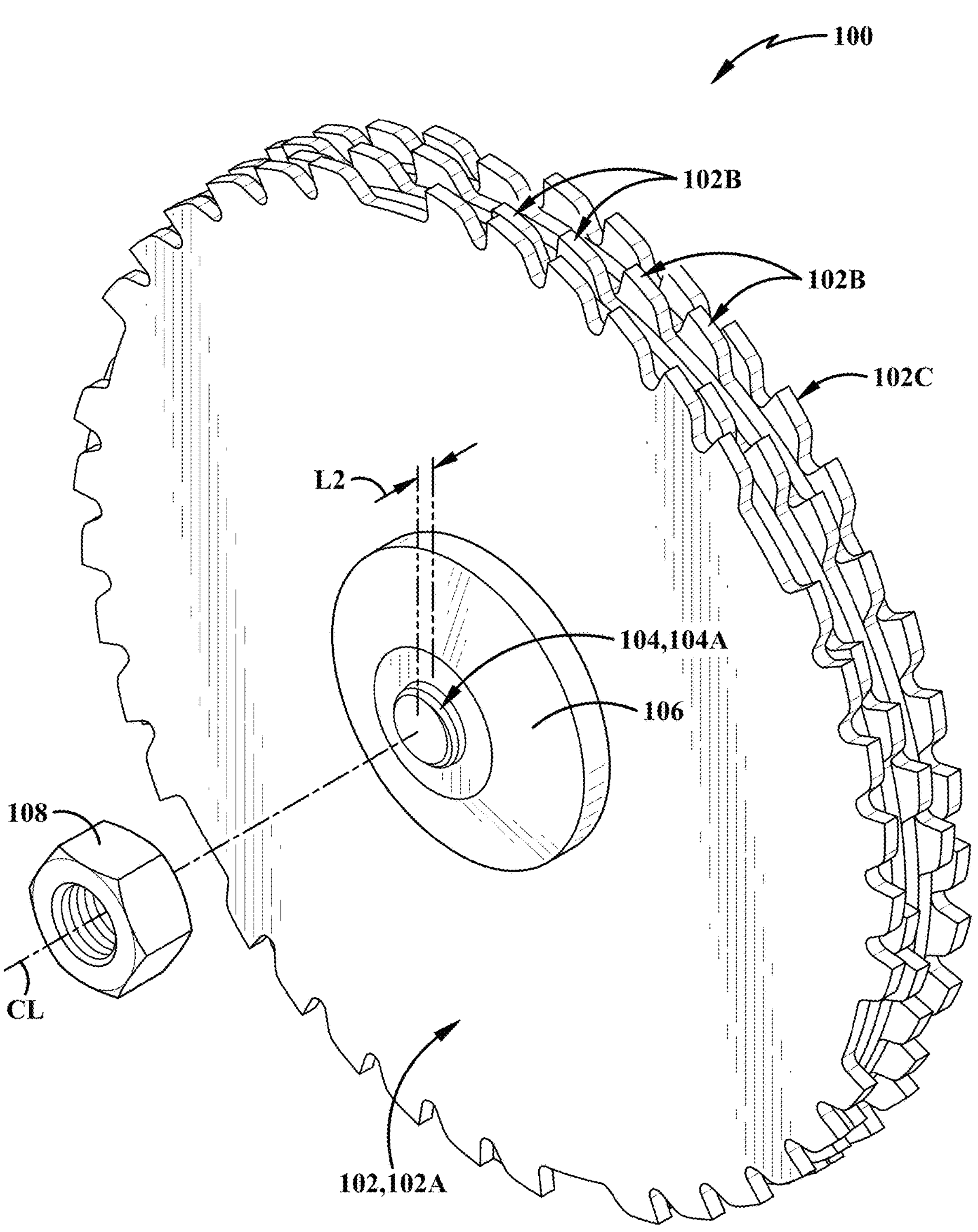
FIG. 1B is a semi-exploded isometric view of an exemplary prior art configuration of a dado cut blade stack and washer on an arbor, and a retaining nut indicating a typical diminished threading on the arbor afforded to the retaining nut.

FIG. 1B is a semi-exploded isometric view of an exemplary prior art configuration of dado cut blade stack 102 and washer 106 on an arbor 104 and retaining arbor nut 108 indicating a typical diminished threading L2 (remaining thread length) on the arbor 104 afforded to retaining arbor nut 108, after placement of arbor washer 106.

Figure 1C:
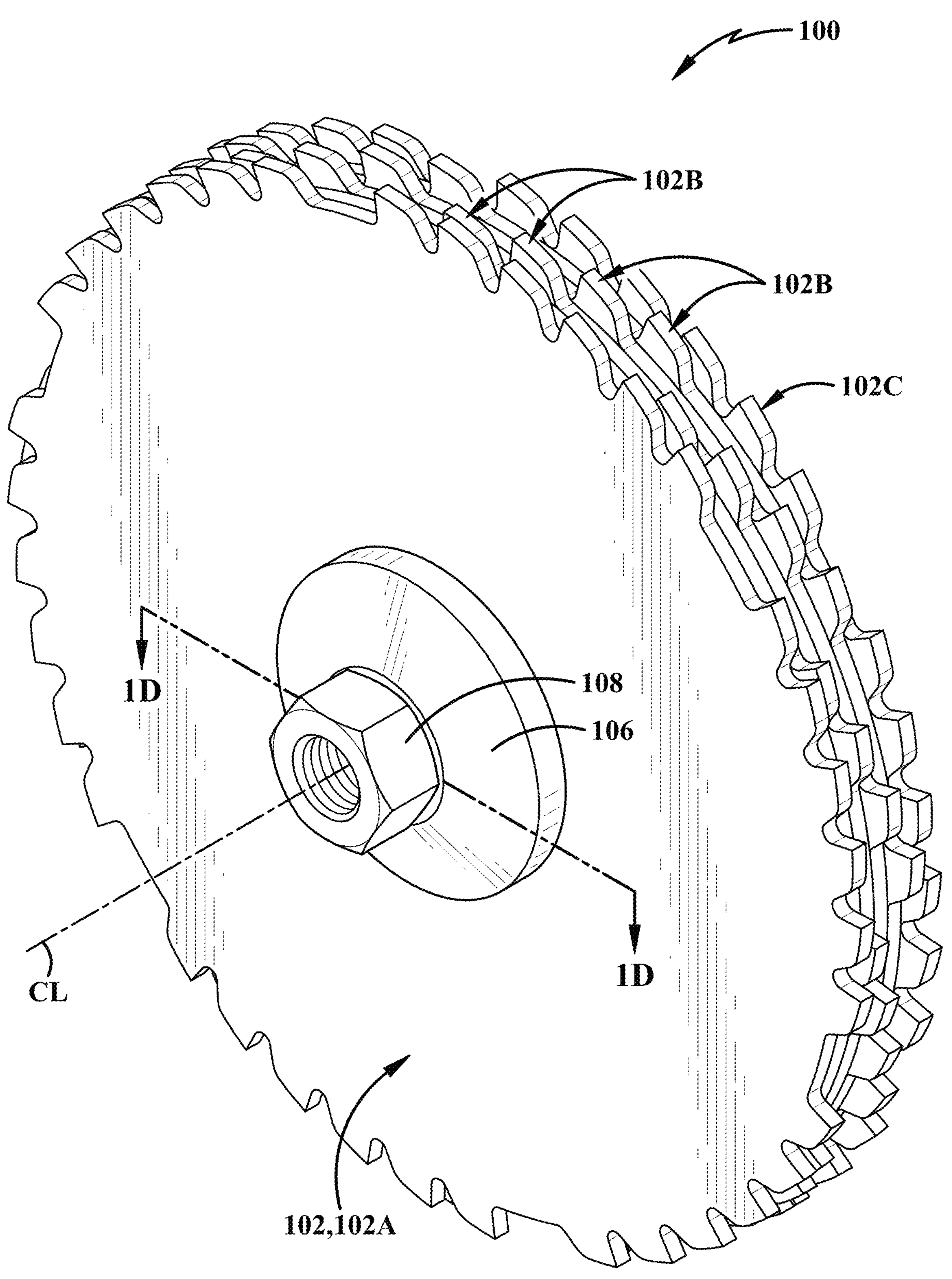
FIG. 1C is an assembled isometric view of an exemplary prior art configuration of a dado cut blade stack, washer, and retaining nut on an arbor.

FIG. 1C is an assembled isometric view of an exemplary prior art configuration of dado cut blade stack 102, arbor washer 106, and retaining arbor nut 108 on arbor 104. In this view, one may see that the standard arbor nut 108 with its internal threads is not fully engaged to length L3. As it is to be appreciated, the lack of full engagement may induce a host of issues, from not having enough holding force through the washer to the dado cut blade stack, to the nut working itself off, and losing all holding force, even to the frustration of attempting to assemble the pieces that secure the dado cut blade stack (or sawblade) on limited arbor threads of a table saw.

Figure 1D:
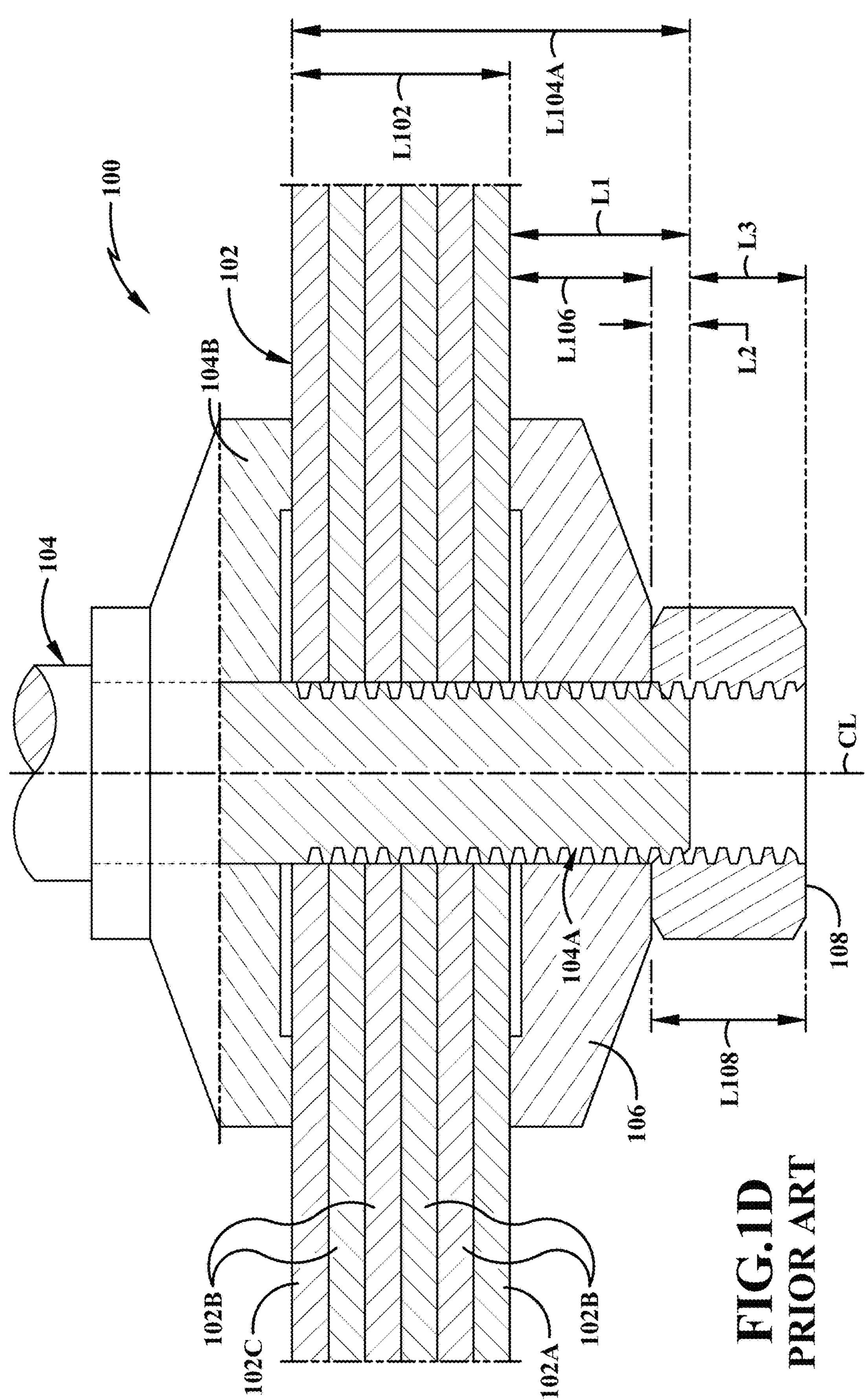
FIG. 1D is a partial cutaway section view of an exemplary prior art configuration of a dado cut blade stack, washer, and retaining nut taken along section 1D-1D of FIG. 1C.

FIG. 1D is a partial cutaway section view of an exemplary prior art configuration of a dado cut blade stack, washer, and retaining nut taken along section 1D-1D of FIG. 1C. The partial cutaway provides the view of arbor 104 and the inner blade washer 104B as a two items. It is to be appreciated that arbor 104 and inner blade washer 104B may be one item or more than one item in embodiments, but in each embodiment for a given arbor, the standard length of threads L104A proceeds from the proximal end of inner blade washer 104B to the end of arbor 104. In an example, dado cut blade stack 102 is shown with inner blade 102C adjacent to inner blade washer 104B, followed by the four chipper blades 102B and outer blade 102A. Dado cut blade stack 102 has an axial length of L102. As noted in FIG. 1A, the remaining length of usable threads on the arbor is L1 (L1=L104A−L102). Also shown is the remaining length of usable threads L2 on arbor 104 after placement of arbor washer 106, having axial length L106 (L2=L1−L106). This is recognized as an arbor with limited thread length remaining on the arbor. As the partial cutaway shows, the number of threads provided by L2 that may be engaged by standard arbor nut 108, having axial length L108, is almost de minimis. The combined axial length of a standard arbor nut length L108 and arbor washer axial length L106 is simply longer than L1, with the difference L3 being the length of unengaged threads (L3={L108+L106}−L1).

Turning to FIG. 2A through FIG. 4C, several views of an embodiment of an apparatus 210 in front and back assembled (integrated), front and back exploded (separable), and a cutaway section in accordance with aspects of the present disclosure are presented. In general, an innovative approach is to modify both a standard arbor nut 108 and a standard arbor washer 106, creating a dado nut 212 and a dado washer 214 whose combination provides for an equivalent threading of a washer-less arbor nut installation that preserves best-cut quality of use with an arbor washer and eases installation of apparatus 210 in comparison to installation of smaller individual piece parts on reduced available threads (see L1 on FIG. 1A and FIG. 5A).

Figure 2A:
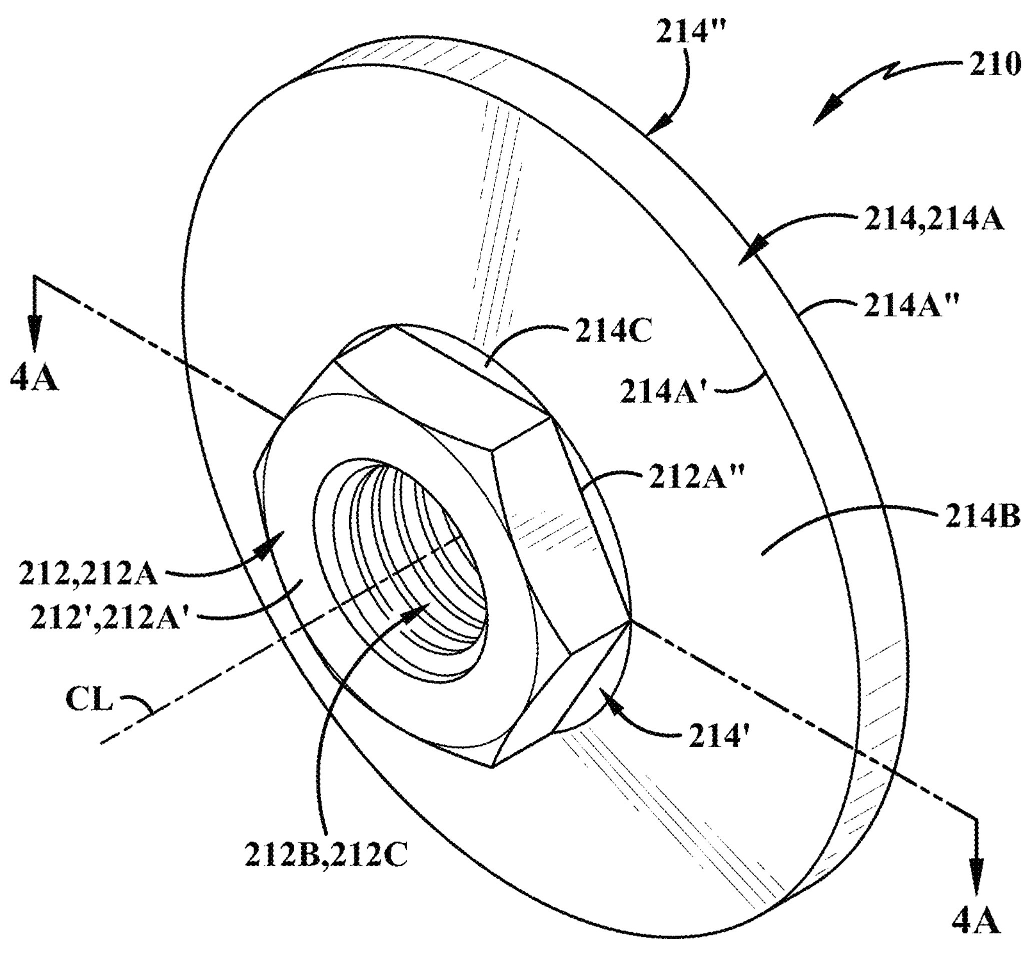
FIG. 2A is an assembled front isometric view of an apparatus in accordance with an aspect of the present disclosure.

FIG. 2A is an assembled front isometric view of an embodiment, for example apparatus 210, providing an assembled view of dado nut 212 and dado washer 214. It is to be appreciated that items will share a centerline CL upon assembly and will be substantially co-axial. In this view, dado nut head 212A of dado nut 212 may be seen as well as the inner diameter threads 212C of dado nut 212. Dado nut head 212A may be configured to be similar to a standard arbor nut head so as to not require any special tools for fastening the dado nut 212. It is contemplated that this standard feature set includes such items as a proximal nut face, hex configuration, hex flat to flat dimensions, hex head length, chamfers, and the like. It is contemplated that providing the head of the dado nut in such manner would provide that no new tools for assembly would be required other than those typically associated with arbor nuts. The tool to engage and disengage apparatus 210 with the arbor may already be present. Proximal end of dado nut 212 may be designated as 212' and distal end of dado nut 212 may be designated as 212" that is opposite to the proximal end 212' relative to the centerline CL.

Figure 4A:
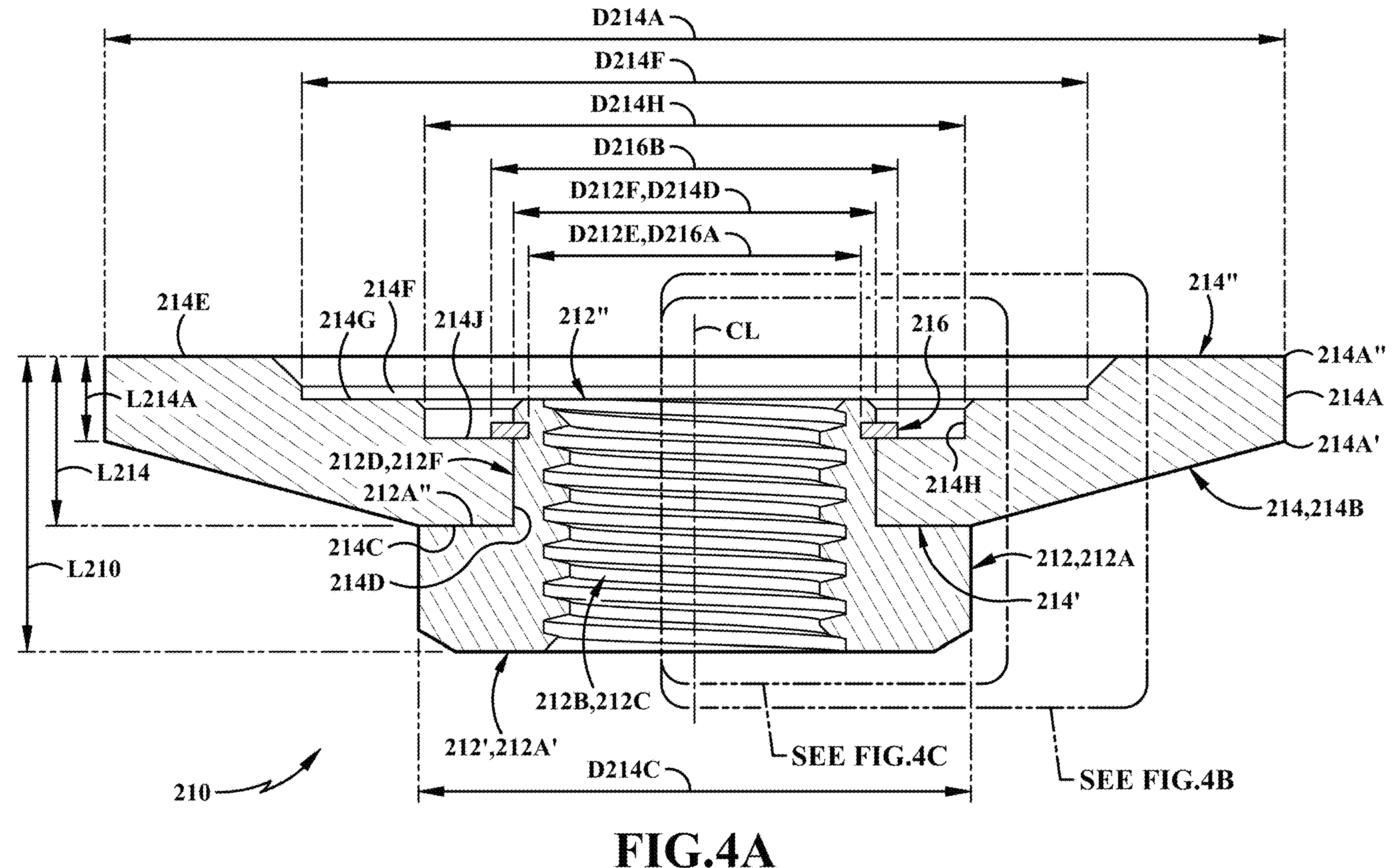
FIG. 4A is a cutaway section view of the apparatus of FIG. 2A taken along section 4-4 in accordance with an aspect of the present disclosure.

In a similar manner, inner diameter threads 212C may be configured to mate with selected standard threads of saw arbors, such as for example threads of arbor 104 of a conventional table saw as discussed above. As best seen in FIG. 4A and FIG. 4C, a passageway 212B defined longitudinally from proximal end 212' through to distal end 212" may have an internal threading defined along a predetermined length of passageway 212B, with the internal threading (or inner diameter threads) 212C adapted to threadably engage with the arbor, for example arbor 104. In other embodiments (not shown), internal threading 212C may be defined along a portion of passageway 212B, either at the proximal end 212', the distal end 212", or at one or more portions in-between. It is to be appreciated that the material of dado nut 212 may be of standard materials as is known in the art. In embodiments, dado nut 212 may be made from a special heat-treated steel that holds up to repeated installation and removal. In embodiments, dado nut 212 may be turned on state-of-the-art Computer Numerically Controlled (CNC) Swiss lathes and be held to strict tolerances for flatness and thread accuracy.

As best seen in FIG. 4C, in an enlarged detail view taken along Detail C of FIG. 4A, dado nut head 212A has a proximal end 212A' and a distal end 212A" that is opposite to the proximal end 212A'. It is to be appreciated that dado nut head proximal end 212A' may be the same as dado nut proximal end 212'. Dado nut head distal end 212A" extends from the flat dimensions of dado nut head 212A radially inward to a shank 212D of dado nut 212. As best seen in FIG. 4A, shank 212D includes a proximal end 212D' (that engages with dado nut head distal end 212A") and a distal end 212D" that is opposite to the proximal end 212D' and spaced apart from the dado nut head 212A. Dado nut distal end 212" terminates at the inner passageway 212B (in this embodiment, dado nut inner diameter threads 212C). It is to be appreciated that dado nut distal end 212" may be chamfered at one or both of its origination and termination edges as is known in the art.

Shank 212D also has a cylindrical surface 212F defined at diameter D212F that axially extends distally from dado nut head distal end 212A" to dado nut distal portion 212" to define an axial length of the dado nut shank L212D. Dado nut 212 also defines a dado nut groove 212E along a portion of the shank 212D. Specifically, the dado nut groove 212E is defined at a specified length (for example, L4) from dado nut head distal end 212A". Dado nut groove 212E also has a depth of diameter D212E and axial length L212E. Cylindrical surface 112F of shank 212D continues to proceed distally, terminating in a transition to dado nut distal portion 212", Returning briefly to FIG. 2A, dado washer 214 includes a dado washer outer surface 214A that has an outer diameter D214A (as best seen in FIG. 4A). It is contemplated that in certain embodiments, dado washer outer diameter D214A may be configured to be a standard arbor washer outside diameter. Still referring to FIG. 2A, dado washer outer surface 214A has a proximal end 214A' that faces the dado nut head 212A when assembled and a distal end 214A" that is opposite to the proximal end 214A'. Proximal end 214A' transitions to a frustrum surface 214B. Frustrum surface 214B terminates in a dado washer proximal annulus 214C that is substantially orthogonal to centerline CL.

Figure 4B:
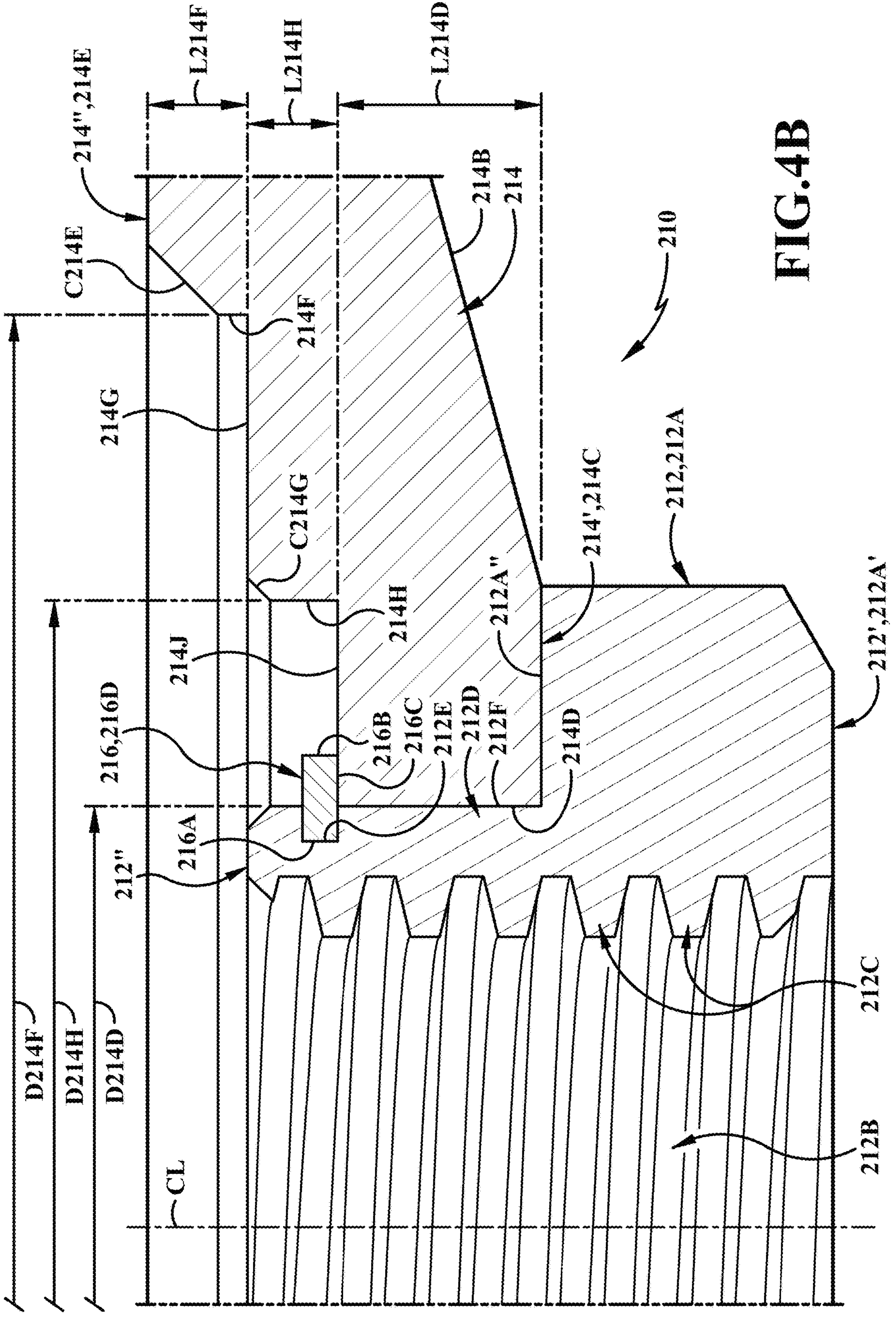
FIG. 4B is an enlarged detail view taken along Detail 4B of FIG. 4A in accordance with an aspect of the present disclosure.
Figure 4C:
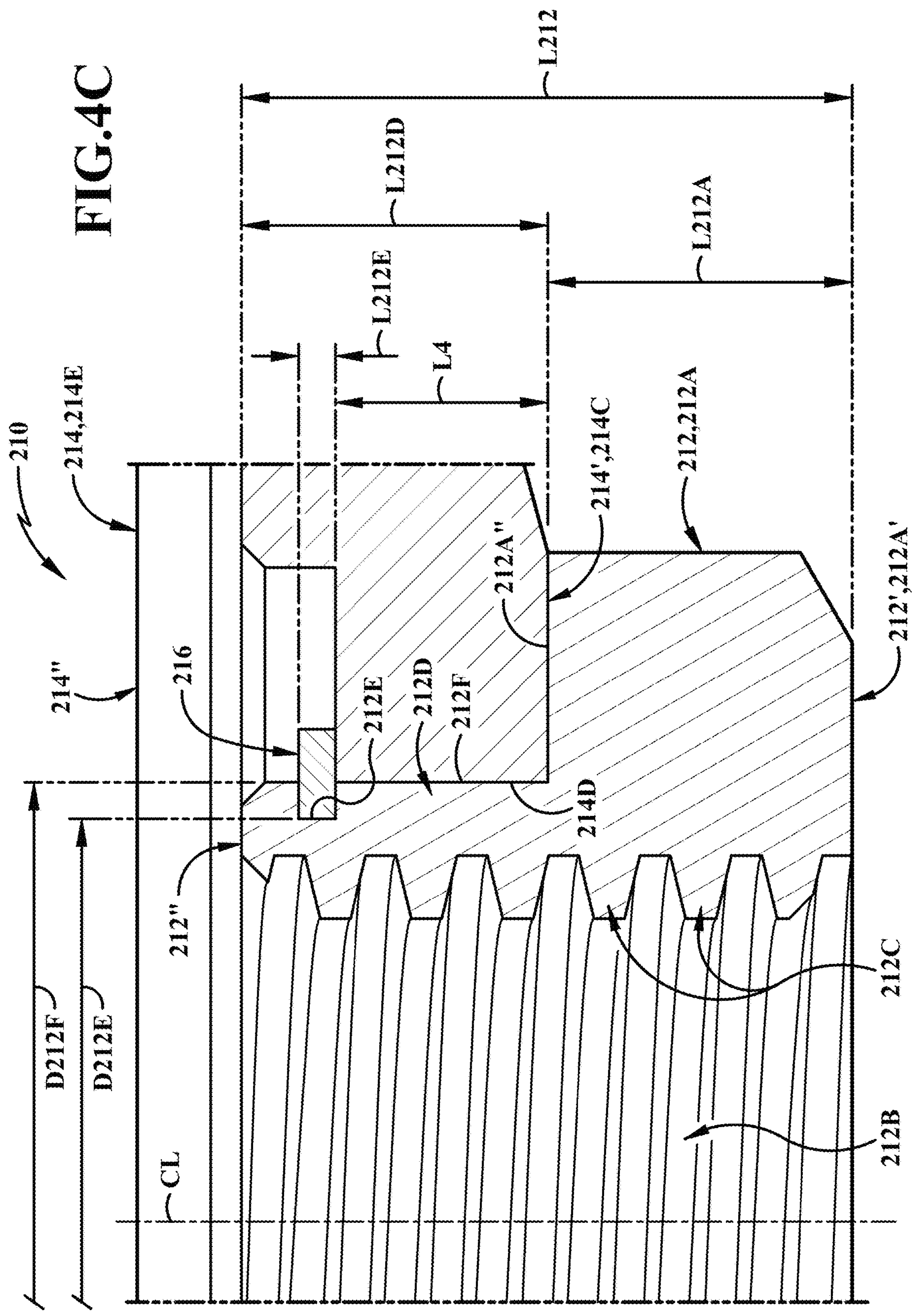
FIG. 4C is an enlarged detail view taken along Detail C of FIG. 4A in accordance with an aspect of the present disclosure.

As best seen in FIG. 4B, an enlarged detail view taken along Detail B of FIG. 4A, centerline CL for dado washer 214 is the same centerline CL of dado nut 212. Termination of frustrum surface 214B at proximal annulus 214C defines an outer diameter D214C generally sized to mate with dado nut head distal end 212A". Proximal annulus 214C progresses to a proximal inner cylindrical surface 214D defined at first inner diameter D214D (best seen in FIG. 4A). Proximal inner cylindrical surface 214D at first inner diameter D214D extends axially in a distal direction from the proximal annulus 214C to a mid-proximal annulus 214J, which defines a passageway through dado washer 214, and is discussed in greater detail below. As best seen in FIG. 4C, the proximal inner cylindrical surface 214D defines a first axial length L214D that is measured between the proximal annulus 214C and the mid-proximal annulus 214J.

Referring to FIG. 4A, distal end 214A" of dado washer 214 terminates in a substantially vertical surface orthogonal to centerline CL and that vertical surface defines furthest distal annulus 214E. In this embodiment, furthest distal annulus 214E transitions to a mid-distal cylindrical surface 214F defined at a mid-distal diameter D214F with a chamfer C214E. Mid-distal cylindrical surface 214F extends a mid-axial length L214F proximally from the distal end 214A" of the dado washer 214 and terminates at a mid-distal annulus 214G of dado washer 214. Mid-distal annulus 214G extends in a substantially vertical surface orthogonal to centerline CL and transitions with a chamfer C214G to cylindrical surface 214H at a lockring clearance diameter D214H. Cylindrical surface 214H at lockring clearance diameter D214H extends proximally a third axial length L214H, and transitions to a mid-proximal annulus 214J. It is to be appreciated that in embodiments, mid-distal annulus 214G and the mid-proximal annulus 214J may provide clearance to install a lockring, for example, lockring 216. Mid-proximal annulus 214J is substantially orthogonal to centerline CL and progresses to first inner diameter D214D. It is to be appreciated that mid-distal diameter D214F and lockring clearance diameter D214H are successively smaller than dado washer outer diameter D214A and each larger than first inner diameter D214D. In other embodiments (not shown), dado washer 214 may comprise only a furthest distal annulus 214E and an mid-proximal annulus 214J. In such other embodiments, it is contemplated that a mid-distal annulus may be omitted and mid-proximal annulus 214J alone may provide clearance to install a lockring, for example lockring 216.

Figure 3A:
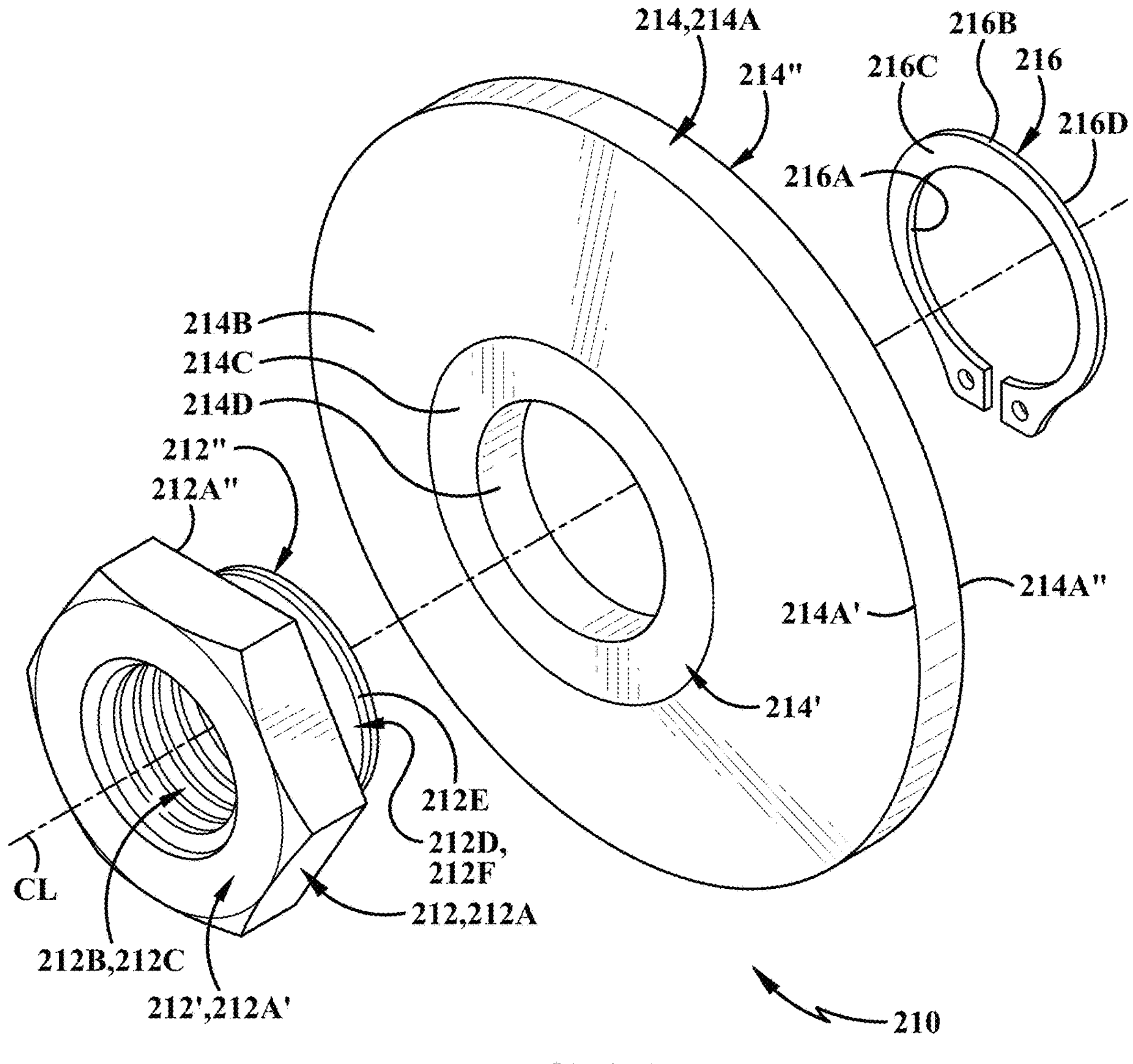
FIG. 3A is an exploded front isometric view of the apparatus of FIG. 2A in accordance with an aspect of the present disclosure.
Figure 3B:
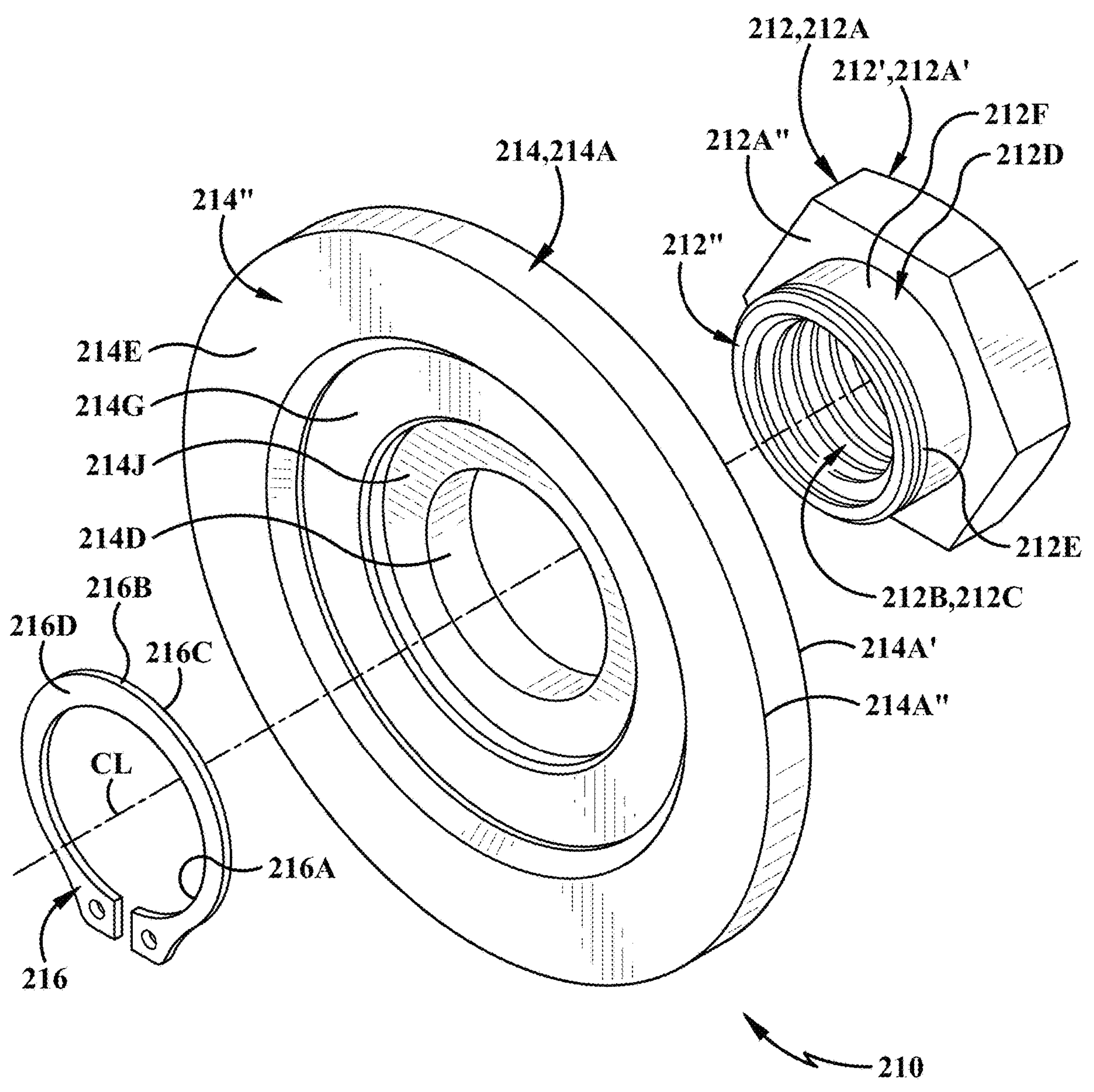
FIG. 3B is an exploded rear isometric view of the apparatus of FIG. 2A in accordance with an aspect of the present disclosure.

Turning briefly to FIG. 3A and FIG. 4A, lockring 216 can be seen to have an inner surface 216A at diameter D216A and an outer surface at diameter D216B. Centerline CL for lockring 216 dado washer 214 is the same centerline CL of dado nut 212 and dado washer 214 and extends through inner surface 216A and outer surface 216B. Opposite and generally parallel to proximal surface 216C is distal surface 216D, as shown in FIG. 3B. In embodiments, proximal surface 216C and distal surface 216D extend from inner surface 216A to outer surface 216B. It is contemplated that lockring 216 may be a standard lockring as known in the art and may be selected according to design purposes.

It is to be appreciated that lockring 216 is configured to set in a portion of dado nut 212 and clampingly engages and/or secures dado washer 214 and dado nut 212 with one another. Dado nut groove 212E serves as a mating recess for an inner portion of lockring 216 (with inner diameter D216A being no smaller than diameter D212E). In embodiments, dado nut 212 and dado washer 214 are rotatably engaged with one another via lockring 216. Proximal surface 216C and distal surface 216D of lockring 216 are configured to have portions contained within dado nut groove length L212E and clampingly mate with dado nut groove 212E. It is to be appreciated that lockring 216 may be a common item known in the art and may be sized to provide an annulus (of an outer diameter portion of proximal surface 216C) that constrains the axial movement of dado washer 214, while permitting free rotation of dado washer 214 in relation to dado nut 212. It is to be further appreciated that constraining the dado washer 214 to dado nut 212 provides an integrated assembly that may be handled much easier as a single item than a number of separate smaller items, providing benefits of easier and quicker securing of dado cut blade stack 102 on a table saw (as discussed in relation to FIG. 5A through FIG. 5C). It is to be further appreciated, the integrated assembly provides for axial force transfer from dado nut 212 being threaded on arbor 104 while maintaining free rotation between dado nut 212 and dado washer 214, preventing the damage that may occur with a fixed unibody one-piece nut/washer configuration (not shown), as may be known in the art. Such designs attempt to drive sufficient threading but suffer from either not providing enough clamping force of the washer/nut unibody to a blade or marring the blade as the washer portion of the unibody may score or warp in the blade as the nut portion tightens.

In other words, it is contemplated that dado nut groove 212E is configured to accept a selected standard lockring, with groove diameter D212E less than shank diameter D212F and greater than dado nut inner diameter threads 212C, wherein groove diameter D212E provides clamping support from a lower portion of lockring 216 and an upper portion of lockring 216 provides clamping support to dado washer 214. It is to be appreciated that in an assembly, inner surface 216A at lockring diameter D216A would rest in dado nut groove 212E, and outer surface 216B at lockring diameter D216B would be radially outbound of dado nut shank cylindrical surface 212F, thus clampingly engaging or securing dado washer 214 and dado nut 212.

Returning briefly to FIG. 3B, aspects of an embodiment of dado washer 214 are visible, notably furthest distal annulus 214E, mid-distal annulus 214G, and mid-proximal annulus 214J. Mid-proximal annulus 214J is shown mated to lockring 216. It is to be appreciated that lockring 216 mates to dado washer 214 in a rotably sliding manner as discussed above. Portion of lockring distal surface 216D is visible. It is to be appreciated that the portion of distal surface 216D not visible serves to clampingly engage or secure lockring 216 and dado nut 212.

Figure 2B:
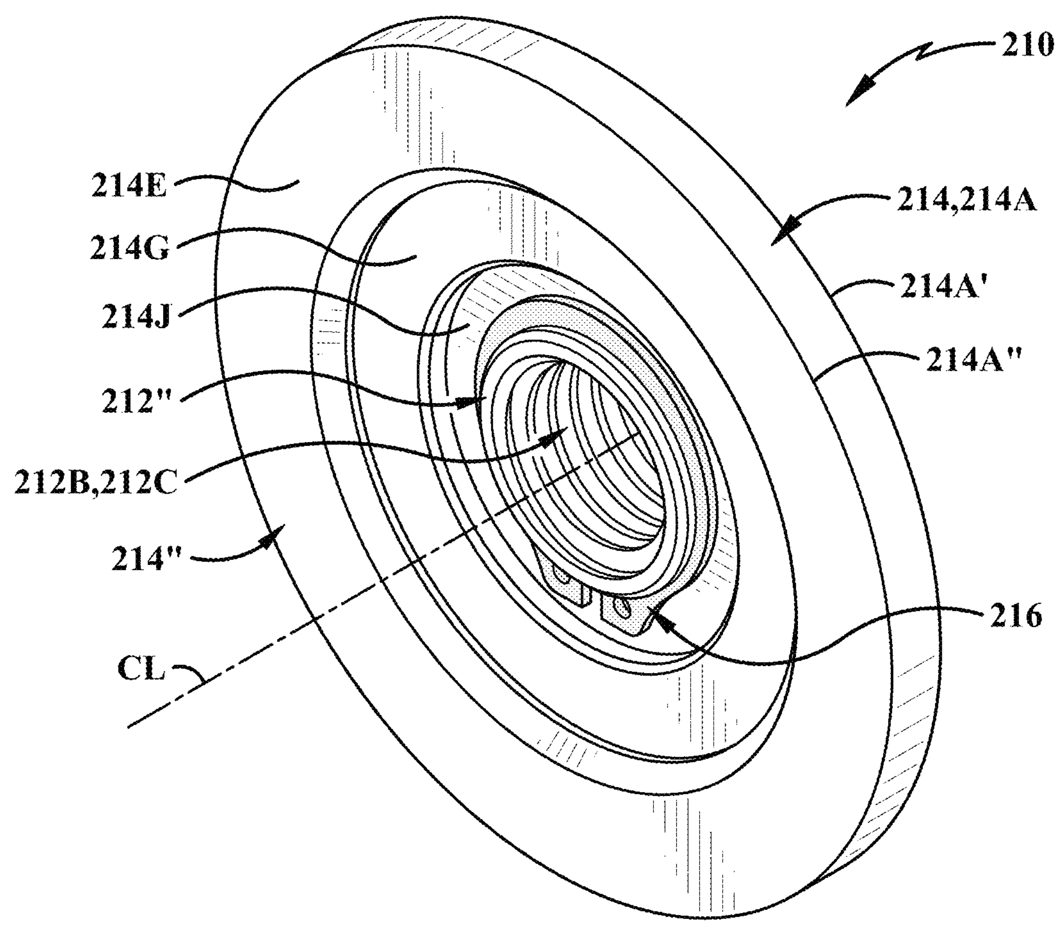
FIG. 2B is an assembled rear isometric view of the apparatus of FIG. 2A in accordance with an aspect of the present disclosure.

This relation may be seen in other views. FIG. 2B presents an assembled rear isometric view of embodiment, for example apparatus 210 that provides an assembled view of dado nut 212 (a portion of inner diameter threads 212C and distal portion 212"), dado washer 214 and lockring 216. A portion of dado washer proximal annulus 214C may be seen mated to dado nut head 212A.

As best seen in FIG. 4B and FIG. 4C, dado nut 212 and dado washer 214 operatively mate. Distal end of dado nut head 212A" may provide an axial tightening force to proximal annulus 214C of washer 214 upon progression of dado nut 212 along arbor 104 while installing (and conversely, relief of axial force while removing). Notwithstanding this transmission of axial force, along length L4 of a portion of dado nut shank cylindrical surface 212F of shank 212D, mating to dado washer first inner diameter cylindrical surface 214D along first axial length L214D that substantially matches length L4 is appreciated to be of a rotatingly sliding connection. In other words, the passageway defined by first inner diameter cylindrical surface permits shank 212D to pass through washer 214. Thus, in embodiments, dado washer 214 freely rotates (or is operationally connected in a rotatingly slidingly manner) around centerline CL. The operative connection may be affected by a number of manners, including without limitation provided by one or both of the dado washer cylindrical surface 214D or portion of dado nut shank cylindrical surface 212F having a slip surface, provided by the dado washer first inner diameter D214D sized to be greater than the dado nut shank outer diameter D212F, and the like.

It is to be appreciated that dado washer 214 (and lockring 216, discussed herein) may be replaceable items in embodiments of apparatus 210. It is contemplated that dado washer 214 may wear or otherwise desired to be replaced (for example, a dado washer with a different outer diameter may be desired). To enact this replacement, one would disengage lockring 216 (non-destructively or destructively) and remove a prior dado washer 214 and replace with an embodiment of a new dado washer 214. A replacement lockring 216 or prior lockring 216 may then be engaged to provide an apparatus 210 that may be completely integrated. It is to be further appreciated that dado washer may be comprised of a different material than dado nut, providing an opportunity for cost savings in use of apparatus 210.

It is contemplated that other embodiments (not shown) may provide for dado washer to rotate freely without lockring installed, or in embodiments in which a different retaining mechanism is present (such as, without limitation, a machined bump or rise greater than D214D at approximately L4 defined on dado shank cylindrical surface 212F which may affect a snap-fit.

Figure 5A:
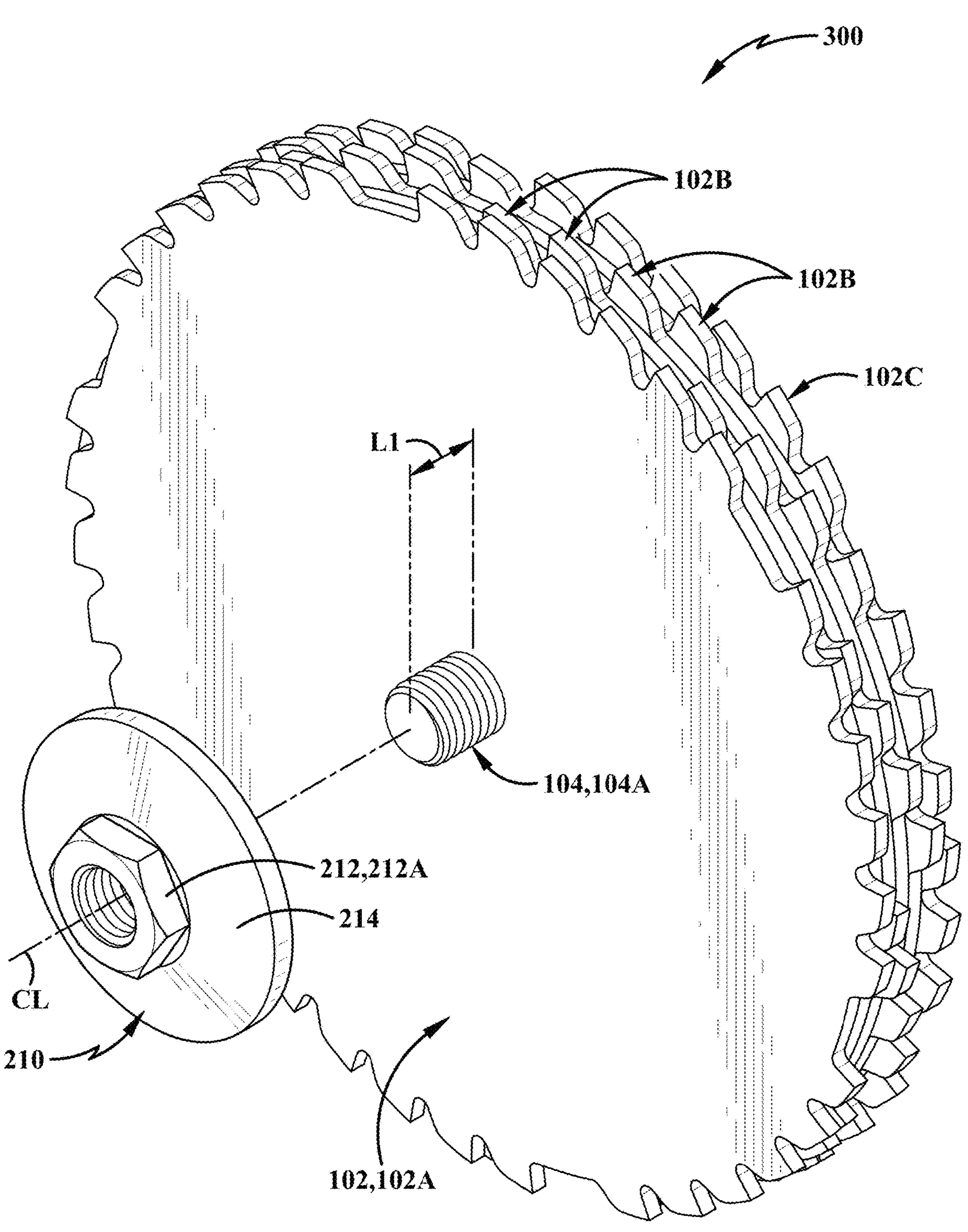
FIG. 5A is a semi-exploded isometric view of an exemplary configuration of a dado cut blade stack on an arbor and the apparatus shown in FIG. 2A in accordance with an aspect of the present disclosure.
Figure 5B:
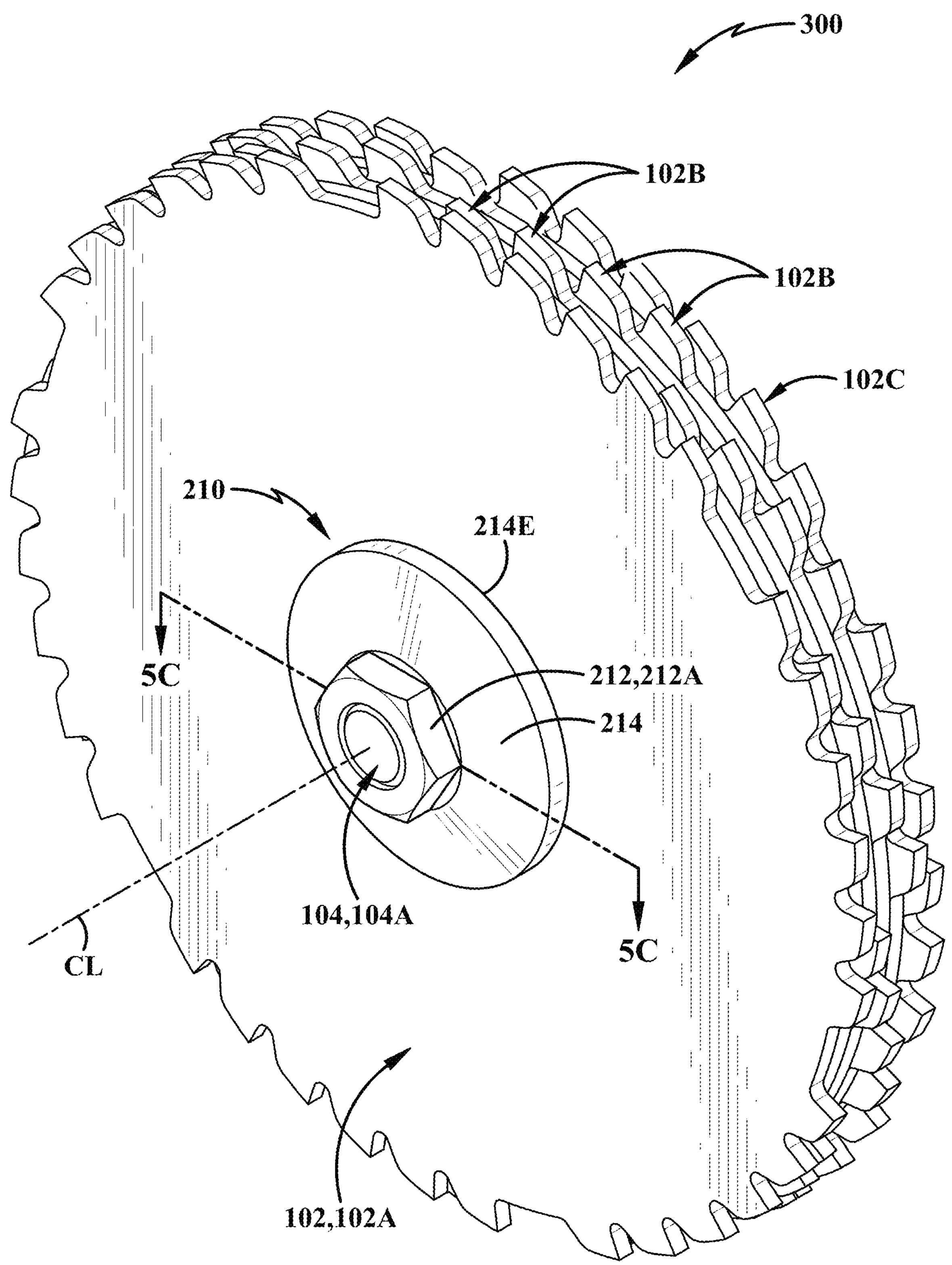
FIG. 5B is a semi-exploded isometric view of an exemplary configuration of a dado cut blade stack and the apparatus engaged with the arbor, indicating a full thread engagement in accordance with an aspect of the present disclosure.
Figure 5C:
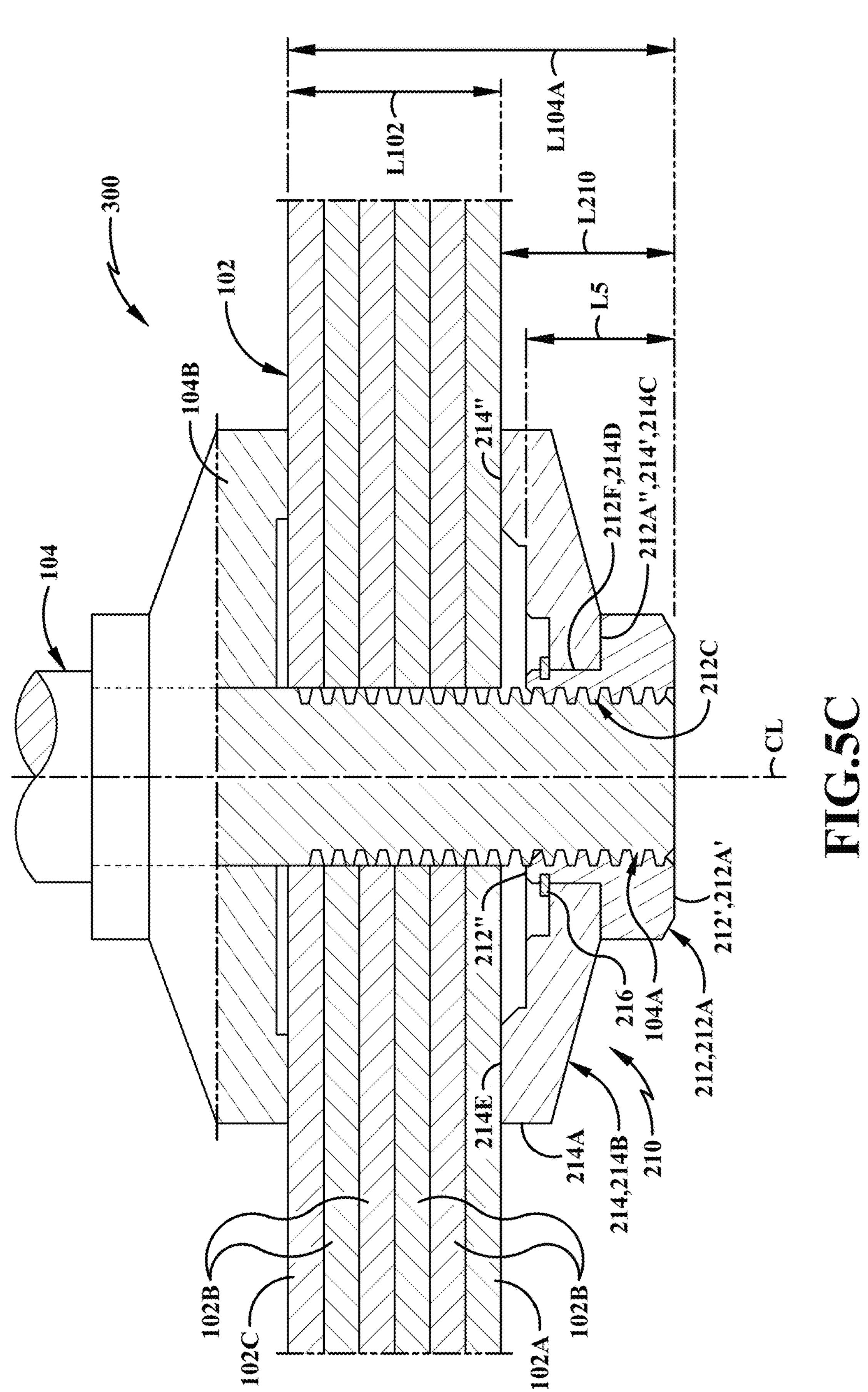
FIG. 5C is a partial cutaway section view of an exemplary configuration of the dado cut blade stack and the apparatus engaged with the arbor taken along section 5C-5C of FIG. 5A in accordance with an aspect of the present disclosure.

Turning to FIG. 5A through FIG. 5C, an embodiment 300 is disclosed for using an integrated dado nut assembly, such as for example apparatus 210 in a use environment for a project using a table saw that has an arbor thread length L2 that does not permit full or substantial thread engagement when the arbor 104 is loaded with a dado cut blade stack 102, standard outer arbor washer 106, and standard retaining arbor nut 108.

FIG. 5A is a semi-exploded isometric view of an exemplary configuration of dado cut blade stack 102 on arbor 104, and apparatus 210 in accordance with an aspect of the present disclosure. It is to be appreciated that most all items will share centerline CL and will be substantially co-axial. In this view, dado cut blade stack 102 has already been placed on arbor 104 of a saw or table saw (not shown), for example, a SawStop™ table saw. In this example, dado cut blade stack 102 provides an outer blade 102A, a number of middle blades 102B (for example, chipper blades, and in this example, the number of chipper blades is four), and inner blade 102C. As shown, the placement of dado cut blade stack 102 leaves thread length L1 on arbor 104. Apparatus 210, as described herein, may be used to secure the sawblade. It is to be appreciated that for standard parts, L1 is most often not sufficient to provide enough axial length of a standard washer (L106, FIG. 1D) and standard nut (L108, FIG. 1D) (that is, L102+L106+L108>L104A; typically by L3, length of nut threads not engaged).

FIG. 5B is an assembled isometric view of an exemplary configuration 300 of dado cut blade stack 102 on arbor 104, and apparatus 210 in accordance with an aspect of the present disclosure. In this view, one may see that apparatus 210 is substantially or fully engaged with little or no dado nut inner diameter threads 212C exposed. As it is to be appreciated, the substantial or full engagement eliminates a host of issues by providing enough holding force from the threading of dado nut 212 of apparatus 210 through the clampingly engaged or secured dado washer 214 of apparatus 210 to the dado cut blade stack 102. There is sufficient thread engagement to prevent the nut working itself off, and losing partial or all holding force, as well as having provided a user ease of handling one integrated piece of apparatus 210 (as opposed to attempting to assemble standard multiple small pieces that secure the dado cut blade stack (or sawblade) on the arbor of the table saw, especially as a smaller last piece may not have many arbor threads left to engage). In this manner, a worker may avoid a situation often encountered previously in the art of an arbor nut falling off and causing blades to move during operation, which could have ruined the work piece and/or caused a safety hazard. Further, a worker avoids a lesser quality cut, which may have been obtained with a choice of omitting an arbor washer, which also avoids a potential of harming equipment (for example, cutting blades becoming distorted). Additionally avoiding an option such as using a unibody washer/nut design avoids the condition of tightening the nut sufficiently to engage the unibody washer against the blade that that would mar and damage the outer blade, or not tightening enough and suffering through a poor cut.

FIG. 5C is a partial cutaway section view of the exemplary configuration 300 taken along section 5C-5C of FIG. 5B. It is to be appreciated that items will share a centerline CL upon assembly and will be substantially co-axial. The partial cutaway provides a view of arbor 104 and inner blade washer 104B as a single item. It is to be appreciated that these may be one item or more than one item in embodiments, but in each embodiment, the standard length of threads L104A for a given arbor proceeds from the proximal end of inner blade washer 104B. In an embodiment, dado cut blade stack 102 is shown with inner blade 102C adjacent to inner blade washer 104B, followed by the four chipper blades 102B and outer blade 102A. As noted in FIG. 5A, the remaining length of usable threads on the arbor is L1. Apparatus 210 is shown being fully threaded onto arbor 104. Portion furthest distal annulus 214E (at distal end of outer surface 214A") is shown in contact with outer blade 102A. The contact in the axial direction is the transferred retaining force from the full threading of apparatus 210's dado nut inner diameter threads 212C. It is to be appreciated that while L5 is less than L210, substantially full thread engagement has been obtained. Threading of inner diameter threads 212C on arbor 104 provides for axial force to mate mid-distal annulus 214G of dado washer 214 of apparatus 210 securely against outer blade 102A of dado cut blade stack 102, while permitting free rotation of dado washer 214 related to dado nut 212. The free rotation is by way of the portion of dado washer 214 (the first inner diameter cylindrical surface 214D) configured to have a rotably slidable interface along a portion of dado nut 212 (dado nut shank cylindrical surface 212F of length L4). It is to be appreciated that the recesses defined by washer elements mid-distal cylindrical surface 214F (at mid-distal diameter D214F), mid-distal annulus 214G, cylindrical surface 214H (at lockring clearance diameter D214H), and mid-proximal annulus 214J (see FIG. 4B) allow not only an installation clearance of lockring 216 to apparatus 210, but also allows pressure of the axial force from progression of inner diameter threads 212C of dado nut 212 on arbor 104 to translate through distal portion of dado nut head 212A" to dado washer proximal annulus 214C and through to dado washer furthest distal annulus 214E, thereby applying pressure from the farthest perimeter of dado washer 214 to outer blade 102A, most effectively providing securing power. As may be appreciated, both changes for installing and removing apparatus 210 enable smoother and quicker operations among other benefits discussed herein. It is also to be appreciated that the apparatus may be used whether a traditional washer is called for or not, effectively replacing a standard arbor nut for most all possible uses within a woodworking project for the saw involved.

Figures 6A, 6B:
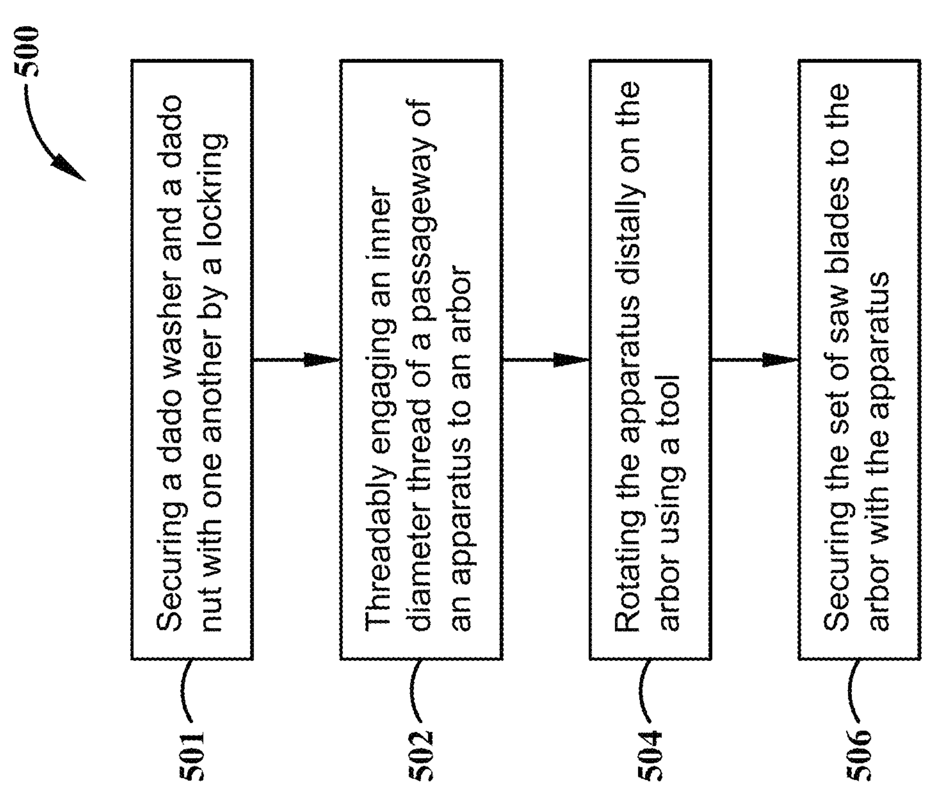
FIG. 6A is an exemplary method flowchart.
FIG. 6B is an exemplary method flowchart.

METHOD 400—FIG. 6A is a method 400 for securing a set of sawblades (for example, a dado cut blade stack 102) on an arbor 104 of a table saw with limited thread length L1 remaining on arbor 104. An initial step 402 of method 400 includes threadably engaging an inner diameter thread 212C of a passageway 212B of an apparatus 210 to the arbor 104. Another step 404 of method 400 includes rotating the apparatus 210 distally on the arbor 104 using a tool (as is known in the art, for example an arbor nut tool associated with table saw, not shown) to a dado nut head (or nut head end or portion) 212A of a dado nut 212 of the apparatus 210, wherein the dado nut 212 freely rotates inside of a dado washer 214 of the apparatus 210, and the dado nut 212 and the dado washer 214 are substantially coaxial. Another step 406 of method 400 includes securing the set of sawblades, for example a dado cut blade stack 102, to the arbor 104 of the table saw with the apparatus 210. It is to be appreciated that securing entails sufficient axial force being translated through dado nut head 212A through proximal annulus 214C of dado washer 214 to furthest distal annulus 214E of dado washer 214 against outer blade 102A of set of sawblades, for example a dado cut blade stack 102.

Turning to FIG. 6B, another exemplary embodiment is provided and may include additional or optional steps in method 500 for securing a set of sawblades (for example, a dado cut blade stack 102) on an arbor 104 of a table saw with limited thread length L1 remaining on arbor 104. In one exemplary embodiment, method 500 may further include a step 501 of securing a dado washer 214 and a dado nut 212 with one another by a lockring 216 and the dado nut 212 and dado washer 214 are removably engageable with one another via the lockring 216. Step 502 of method 500 includes threadably engaging an inner diameter thread 212C of a passageway 212B of an apparatus 210 to the arbor 104. Another step 504 of method 500 includes rotating the apparatus 210 distally on the arbor 104 using a tool (as is known in the art, for example an arbor nut tool associated with table saw, not shown) to a dado nut head (or nut head end or portion) 212A of a dado nut 212 of the apparatus 210, wherein the dado nut 212 freely rotates inside of a dado washer 214 of the apparatus 210, and the dado nut 212 and the dado washer 214 are substantially coaxial. Another step 506 of method 500 includes securing the set of sawblades, for example a dado cut blade stack 102, to the arbor 104 of the table saw with the apparatus 210. It is to be appreciated that securing entails sufficient axial force being translated through dado nut head 212A through proximal annulus 214C of dado washer 214 to furthest distal annulus 214E of dado washer 214 against outer blade 102A of set of sawblades, for example a dado cut blade stack 102.

In another exemplary embodiment, method 500 may further include step 501 of securing a dado washer 214 and a dado nut 212 with one another by a lockring 216 in which step 501 may provide that lockring 216 is clampingly engaging with a portion of shank 212D of the dado nut 212 inside of a groove (for example, dado nut groove 212E) defined in the portion of shank 212D; and with a first of at least two distal annular surfaces (for example mid-proximal annulus 214J) of dado washer 214. It is to be appreciated that embodiments of method 500 are especially advantageous in conditions that a limited remaining thread length L1 of arbor 104 precludes a securing the set of sawblades on the arbor 104 with a standard washer 106 and standard nut 108.

Unless explicitly stated that a particular shape or configuration of a component is mandatory, any of the elements, components, or structures discussed herein may take the form of any shape. Thus, although the figures depict the various elements, components, or structures of the present disclosure according to one or more exemplary embodiments, it is to be understood that any other geometric configuration of that element, component, or structure is entirely possible.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Any flowchart and/or block diagrams in the Figures illustrate some exemplary architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc. As another example, "at least one of: A, B, or B" is intended to cover A, B, C, A-B, A-C, B-C, and A-B-C, as well as any combination with multiple of the same item.

While components of the present disclosure are described herein in relation to each other, it is possible for one of the components disclosed herein to include inventive subject matter, if claimed alone or used alone. In keeping with the above example, if the disclosed embodiments teach the features of A and B, then there may be inventive subject matter in the combination of A and B, A alone, or B alone, unless otherwise stated herein.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present disclosure.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments. Furthermore, the use of any and all examples or exemplary language ("e.g.," "such as," or the like) is intended merely to better illustrate or illuminate the embodiments and does not pose a limitation on the scope of that or those embodiments. No language in this specification should be construed as indicating any unclaimed element as essential to the practice of the disclosed embodiment.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element or "another" element, that does not preclude there being more than one of the additional elements or the another element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein. Further, recitation of ranges of values herein are not intended to be limiting, referring instead individually to any and all values falling within that range, unless otherwise indicated herein, and each separate value within such range is incorporated into the specification as if it were individually recited herein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

To the extent that the present disclosure has utilized the term "invention" in various titles or sections of this specification, or in the context of those sections, this term has been included as required by the formatting requirements of word document submissions (i.e., docx submissions) pursuant the guidelines/requirements of the United States Patent and Trademark Office and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed is:

1. An apparatus for retaining a saw blade set on an arbor, the apparatus comprising:

a dado washer having an inner cylindrical surface at an inner diameter;

a dado nut having a head portion adapted to engage with a tool, the head portion of the dado nut having a dado nut head size associated therewith;

a shank portion of the dado nut extending longitudinally from the head portion wherein a portion of the shank portion of the dado nut operably engages with the surface at the inner diameter of the dado washer; and a lockring operably engaging with the shank portion of the dado nut and with the dado washer;

wherein the dado washer has a proximal annular surface and at least two distal annular surfaces, the proximal annular surface rotatably engaging with the dado nut head portion, a first of the at least two distal annular surfaces adapted to engage with the saw blade set;

wherein the first of the least two distal annular surfaces defines a dado washer furthest distal annulus, a second of the at least two distal annular surfaces being interior to the first of the least two distal annular surfaces and providing clearance to install the lockring, the second of the of the at least two distal annular surfaces engaging with the lockring, the dado washer furthest distance annulus transitioning to a mid-distal cylindrical surface, the mid-distal cylindrical surface terminating at a mid-distal annulus, the mid-distal annulus being distinct from the second of the at least two distal annular surfaces, the mid-distal cylindrical surface defining a mid-distal diameter, the mid-distal annulus transitioning to a lockring clearance cylindrical surface, the lockring clearance cylindrical surface transitioning to the second of the at least two distal annular surfaces, the lockring clearance cylindrical surface defining a lockring clearance diameter, the mid-distal diameter and the lockring clearance diameter each being larger than the inner diameter of the dado washer, the mid-distal diameter being greater than the dado nut head size, the dado washer thereby configured to translate axial force from the dado nut head toward a perimeter of the dado washer;

wherein the head portion of the dado nut head defines a proximal dado nut head surface, the dado nut, including the shank portion thereof, defining a dado nut length; and wherein the dado nut and the dado washer together define a nut-washer assembly, a distance from the first distal annular surface to the proximal dado nut head surface defines an assembly length of the nut-washer assembly, the assembly length of the nut-washer assembly being greater than the dado nut length;

wherein the dado nut is adapted to be threadably engageable with the arbor; and wherein the dado nut is substantially coaxial with the dado washer.

2. The apparatus of claim 1, wherein the portion of the shank portion of the dado nut operably engaging with the surface at the inner diameter of the dado washer rotatably engages therewith.

3. The apparatus of claim 1, wherein the dado nut and dado washer are removably engageable with one another via the lockring.

4. The apparatus of claim 1, further comprising:

a dado nut groove defined in the shank portion of the dado nut, wherein the lockring operably engages with the shank portion inside of the dado nut groove.

5. The apparatus of claim 4, wherein the proximal annular surface rotatably engages with a distal portion of the dado nut head portion, and a second of the at least two distal annular surfaces rotably engages with the lockring.

6. The apparatus of claim 1, wherein the proximal annular surface rotatably engages with a distal portion of the dado nut head portion, and the second of the at least two distal annular surfaces rotably engages with the lockring.

7. The apparatus of claim 1, wherein the portion of the shank portion of the dado nut that operably engages with the inner cylindrical surface at the inner diameter of the dado washer is provided by one or both of the surface at the inner diameter of the dado washer or the portion of the shank portion of the dado nut having a slip surface.

8. The apparatus of claim 1, wherein the portion of the shank portion of the dado nut that operably engages with the inner cylindrical surface at the inner diameter of the dado washer is provided by the dado washer inner diameter sized to be greater than an outer diameter of the shank portion of the dado nut.

9. An apparatus for retaining a saw blade set on an arbor with a limited open thread dimension comprising:

a removable dado washer, having a proximal annular surface, an inner cylindrical surface at an inner diameter, and at least two distal annular surfaces;

a dado nut having a head portion and a shank portion and being threadably engageable with the arbor, the head portion of the dado nut having a dado nut head size associated therewith; and a lockring operably engaging with the shank portion of the dado nut and with the dado washer;

wherein the dado nut is substantially coaxial with the removable dado washer and the removable dado washer is freely rotating about the dado nut;

wherein a first of the at least two distal annular surfaces adapted to engage with the saw blade set;

wherein the first of the least two distal annular surfaces defines a dado washer furthest distal annulus, a second of the at least two distal annular surfaces being interior to the first of the least two distal annular surfaces and providing clearance to install the lockring, the second of the of the at least two distal annular surfaces engaging with the lockring, the dado washer furthest distance annulus transitioning to a mid-distal cylindrical surface, the mid-distal cylindrical surface terminating at a mid-distal annulus, the mid-distal annulus being distinct from the second of the at least two distal annular surfaces, the mid-distal cylindrical surface defining a mid-distal diameter, the mid-distal annulus transitioning to a lockring clearance cylindrical surface, the lockring clearance cylindrical surface transitioning to the second of the at least two distal annular surfaces, the lockring clearance cylindrical surface defining a lockring clearance diameter, the mid-distal diameter and the lockring clearance diameter each being larger than the inner diameter of the dado washer, the mid-distal diameter being greater than the dado nut head size, the dado washer thereby configured to translate axial force from the dado nut head toward a perimeter of the dado washer;

wherein the head portion of the dado nut head defines a proximal dado nut head surface, the dado nut, including the shank portion thereof, defining a dado nut length; and wherein the dado nut and the dado washer together define a nut-washer assembly, a distance from a second distal annular surface to the proximal dado nut head surface defining an assembly length of the nut-washer assembly, the assembly length of the nut-washer assembly being greater than the dado nut length.

10. The apparatus of claim 9, wherein the lockring operably engages with the second of the at least two distal annular surfaces of the removable dado washer; and further comprising a dado nut groove defined in the shank portion of the dado nut wherein the lockring operably engages with the shank portion inside the dado nut groove.

11. The apparatus of claim 10, wherein the proximal annular surface rotably engages with a distal portion of the dado nut head portion, the second of the at least two distal annular surfaces rotably engages with and provides clearance to the lockring.

12. The apparatus of claim 9, wherein the removable dado washer freely rotating is provided by at least one of:

the surface at the inner diameter of the removable dado washer engaging with a portion of the shank portion of the dado nut and one or both of the surface at the inner diameter of the removable dado washer or the portion of the shank portion of the dado nut having a slip surface; and the surface at the inner diameter of the removable dado washer engaging with a portion of the shank portion of the dado nut and the dado washer inner diameter sized to be greater than an outer diameter of the shank portion of the dado nut.

* * * * *